(12) United States Patent
Rimmer

(10) Patent No.: US 9,992,830 B2
(45) Date of Patent: Jun. 5, 2018

(54) POWER DISTRIBUTION

(71) Applicant: ISOTERA LTD, St. Neots, Cambridgeshire (GB)

(72) Inventor: Philip John Rimmer, St. Neots (GB)

(73) Assignee: Greengage Lighting Limited (GB)

( * ) Notice: Subject to any disclaimer, the term of this patent is extended or adjusted under 35 U.S.C. 154(b) by 0 days. days.

(21) Appl. No.: 15/034,960

(22) PCT Filed: Nov. 7, 2014

(86) PCT No.: PCT/GB2014/053328
§ 371 (c)(1),
(2) Date: May 6, 2016

(87) PCT Pub. No.: WO2015/067963
PCT Pub. Date: May 14, 2015

(65) Prior Publication Data
US 2016/0270174 A1    Sep. 15, 2016

(30) Foreign Application Priority Data

Nov. 7, 2013  (GB) .................................. 1319649.8

(51) Int. Cl.
*H05B 33/08* (2006.01)
(52) U.S. Cl.
CPC ..... *H05B 33/0818* (2013.01); *H05B 33/0803* (2013.01); *H05B 33/083* (2013.01);
(Continued)
(58) Field of Classification Search
CPC ............ H05B 33/0815; H05B 33/0803; H05B 33/0809; H05B 33/0839; H05B 33/0845;
(Continued)

(56) References Cited

U.S. PATENT DOCUMENTS 5,801,932 A * 9/1998 Hwang ............. H02M 3/33569
363/16
6,111,769 A * 8/2000 Zhang ..................... H02M 1/34
363/127
(Continued)

FOREIGN PATENT DOCUMENTS

GB        2475518 A        5/2011

OTHER PUBLICATIONS

Search report, GB application No. 1319649.8, dated Apr. 6, 2014, 2 pages.

(Continued)

*Primary Examiner* — Vibol Tan
(74) *Attorney, Agent, or Firm* — Ware, Fressola, Maguire & Barber LLP

(57) ABSTRACT

Several aspects of power distribution systems are described. One aspect relates to apparatus for providing a direct current to a load comprising one or more light emitting diodes. The apparatus comprises: a rectifier operatively connectable to a secondary winding of a transformer whose primary winding is for carrying a high-frequency alternating current; a first capacitor operatively connectable to the secondary winding; and a second capacitor operatively connectable, at least partly via the rectifier, to the secondary winding. The first and second capacitors together provide a reactance referred to the primary winding which substantially compensates for the reactance of the primary winding.

6 Claims, 13 Drawing Sheets

(52) U.S. Cl.
CPC ..... *H05B 33/0815* (2013.01); *H05B 33/0845* (2013.01); *Y02B 20/347* (2013.01)

(58) Field of Classification Search
CPC ............ H05B 33/0821; H05B 33/0833; H05B 33/0887; H05B 37/02; H05B 33/0818; H05B 33/083; Y02B 20/346; Y02B 70/1433; Y02B 70/1475; Y02B 20/347
See application file for complete search history.

(56) References Cited

U.S. PATENT DOCUMENTS

| | | | | |
|---|---|---|---|---|
| 6,349,046 | B2* | 2/2002 | Yasumura | .................. 363/21.02 |
| 6,490,183 | B2* | 12/2002 | Zhang | ............... H02M 3/33592 363/127 |
| 6,504,732 | B2* | 1/2003 | Abe | ...................... H02M 1/096 363/16 |
| 7,304,436 | B2* | 12/2007 | Cho | .................... H02M 7/5387 315/167 |
| 7,928,664 | B2* | 4/2011 | Beland | ............... H05B 33/0803 315/244 |
| 2007/0211500 | A1* | 9/2007 | Leung | ............... H02M 3/33569 363/22 |
| 2007/0236159 | A1 | 10/2007 | Beland | |
| 2011/0068704 | A1 | 3/2011 | McKinney | |
| 2011/0074304 | A1 | 3/2011 | Honsberg-Reidl et al. | |
| 2011/0148325 | A1 | 6/2011 | Trovo' | |
| 2012/0013187 | A1 | 1/2012 | Zhang | |
| 2012/0262081 | A1* | 10/2012 | Zhang | ................ H05B 33/0815 315/223 |
| 2012/0286678 | A1 | 11/2012 | Wu et al. | |
| 2014/0184102 | A1* | 7/2014 | Cheng | ................ H05B 33/0815 315/307 |

OTHER PUBLICATIONS

Search Report, International application No. PCT/GB2014/053328, dated Jun. 5, 2015, 5 pages.

* cited by examiner

POWER DISTRIBUTION

FIELD

The present invention relates to aspects of systems for distributing power.

BACKGROUND

Various systems for distributing power are known. For example, WO 2010/106375 A2 describes a power distribution system for distributing high-frequency alternating current (AC) power. The system involves a twisted-pair conductor and power tapping elements to light-emitting diode (LED) loads.

SUMMARY

According to a first aspect of the present invention, there is provided apparatus for providing a direct current to a load comprising one or more light emitting diodes, the apparatus comprising: a rectifier operatively connectable to a secondary winding of a transformer whose primary winding is for carrying a high-frequency alternating current; a first capacitor operatively connectable to the secondary winding; and a second capacitor operatively connectable, at least partly via the rectifier, to the secondary winding, wherein the first and second capacitors together provide a reactance referred to the primary winding which substantially compensates for the reactance of the primary winding.

Thus, firstly, stability of the direct current provided to the load with respect to changes in impedance of the load can be increased, and, secondly, efficiency of the rectifier can be increased.

The first and second capacitors may each provide substantially the same reactance referred to the primary winding. The secondary winding may have first and second outer taps and a centre tap; the first capacitor may have a first terminal operatively connectable to the first outer tap and may have a second terminal operatively connectable to the second outer tap; and the second capacitor may have a first terminal operatively connectable, via the rectifier, to the first and second outer taps, and may have a second terminal operatively connectable to the centre tap. The apparatus may comprise an inductor configured to smooth a current originating from the rectifier.

According to a second aspect of the present invention, there is provided apparatus for providing a direct current to a load comprising one or more light emitting diodes, the apparatus comprising: a rectifier operatively connectable to a secondary winding of a transformer whose primary winding is for carrying a high-frequency alternating current; and a switch configured to periodically interrupt a current originating from the rectifier, thereby reducing an average level of the direct current provided to the load.

Thus, the level of the direct current provided to the load can be controlled, without producing unsuitable voltage harmonics in a cable which includes the primary winding.

The switch may be configured to interrupt the current originating from the rectifier by completing a path therefor between first and second outputs of the rectifier. The switch may be configured to interrupt the current originating from the rectifier with a frequency which is equal to a frequency of the current originating from the rectifier, a multiple thereof or a factor thereof. The switch may be configured to interrupt the current originating from the rectifier for a pre-set and/or controllable fraction of the time. The apparatus may comprise a first inductor configured to smooth the current originating from the rectifier, thereby providing a first current; the switch may be configured to periodically interrupt the first current, thereby providing a second current; and the apparatus may further comprise a second inductor configured to smooth the second current.

According to a third aspect of the present invention, there is provided apparatus for providing a direct current to a load comprising one or more light emitting diodes, wherein the voltage across the load is predetermined, the apparatus comprising a synchronous rectifier operatively connectable to a secondary winding of a transformer whose primary winding is for carrying a high-frequency alternating current. The rectifier comprises field-effect transistors controlled by a further secondary winding of the transformer, wherein, for the predetermined voltage across the load, the maximum gate voltage provided to each of the transistors is above a threshold voltage and below a maximum safe gate voltage. Alternatively or additionally, a current from the rectifier is provided directly to the load (the apparatus need not include an inductor to smooth the current from the rectifier). Alternatively or additionally, the apparatus is configured to controllably bias the further secondary winding to stop the direct current to the load.

Thus, the apparatus can be cost-efficient and energy-efficient and can be used to provide a direct current to a specified load.

According to a fourth aspect of the present invention, there is provided apparatus for providing a direct current to a load comprising one or more light emitting diodes, the apparatus comprising a rectifier operatively connectable to a secondary winding of a transformer whose primary winding is for carrying a high-frequency alternating current, wherein a current from the rectifier is provided directly to the load, the apparatus further comprising a capacitor in parallel with at least part of the load, the capacitor having a capacitance within 25% of a first capacitance, the first capacitance associated with a voltage across the capacitor being within 1% of a minimum level for less than 1% of each cycle of a voltage across the load, wherein the minimum level corresponds to the voltage across the capacitor if the direct current to the load were to be stopped for a long period of time.

Thus, the production of voltages harmonics in a cable which includes the primary winding can be reduced.

The capacitor may have a capacitance within 5% of the first capacitance.

According to a fifth aspect of the present invention, there is provided apparatus for providing a direct current to a load comprising one or more light emitting diodes, the apparatus comprising a synchronous rectifier operatively connectable to a secondary winding of a transformer whose primary winding is for carrying a high-frequency alternating current, wherein the rectifier comprises field-effect transistors controlled by a further secondary winding of the transformer, wherein the apparatus is configured to sense a voltage across the load and, in response to determining that the voltage across the load is above a predetermined level, to bias the further secondary winding to stop the direct current to the load.

Thus, the direct current to the load can be automatically stopped when, for example, a load develops a fault or becomes disconnected.

The voltage across the load may be used to provide a voltage for biasing the further secondary winding; the apparatus may comprise a capacitor configured such that the voltage for biasing the further secondary winding remains above a level at which the direct current to the load is stopped for a predetermined period of time; and the circuitry may comprise circuitry configured to accelerate a rate of reduction of the voltage for biasing the further secondary winding below a further predetermined level.

The apparatus may comprise a Zener diode configured to charge the capacitor when the voltage across the load is above the predetermined level, wherein the Zener diode is conductive for a further predetermined period of time, and the ratio of the further period of time to the period of time is such that an average power dissipated in the Zener diode is below a maximum level associated therewith.

According to a sixth aspect of the present invention, there is provided apparatus for providing a direct current to a load comprising one or more light emitting diodes, the apparatus comprising a synchronous rectifier operatively connectable at least to first and second outer taps of a secondary winding of a transformer whose primary winding is for carrying a high-frequency alternating current, wherein the apparatus is configured to cause the synchronous rectifier to provide a current path between the first and second outer taps for a controllable fraction of each of a plurality of half cycles of a voltage across the rectifier, thereby controllably delaying the voltage across the rectifier relative to a current provided by the rectifier, and controllably reducing the direct current provided to the load Thus, the apparatus can be simple and cost-effective and can control the direct current provided to the load.

The synchronous rectifier may comprise first and second switches operatively connectable to the first and second outer taps, respectively, and configured to provide a rectified current to an output of the synchronous rectifier; and the synchronous rectifier may be configured to provide the current path by causing the first and second switches to be simultaneously conductive. The fraction may begin each time the voltage across the rectifier approaches zero. The apparatus may be configured to determine the fraction by comparing the current provided to the load and/or a voltage across the load with a control signal.

The apparatus according to the second or sixth aspect of the present invention may comprise: a first capacitor operatively connectable to the secondary winding; and a second capacitor operatively connectable, at least partly via the synchronous rectifier, to the secondary winding, wherein the first and second capacitors together provide a reactance referred to the primary winding which substantially compensates for the reactance of the primary winding.

The apparatus according to any one of the first to sixth aspects of the present invention may comprise the secondary winding and a core configured to receive a part of a cable carrying the alternating current, the part of the cable forming the primary winding.

According to a seventh aspect of the present invention, there is provided apparatus comprising: first and second outputs for providing a high-frequency alternating current to a cable which forms a completed circuit therefor; an inverter configured to provide a preliminary high-frequency alternating current; circuitry configured to modify the preliminary alternating current, wherein the circuitry comprises a capacitor with first and second terminals operatively connected to the first and second outputs, respectively; and an inductor configured to suppress current harmonics produced by the capacitor in response to voltage harmonics produced by one or more devices operatively connected to the cable.

Thus, the apparatus can provide a high-frequency alternating current with a low total harmonic distortion, even when used with devices which produce voltage harmonics (e.g. a device comprising apparatus according to the third aspect of the present invention).

According to an eighth aspect of the present invention, there is provided apparatus comprising: first and second inputs for receiving a first high-frequency alternating current; first and second outputs for providing a second high-frequency alternating current, the first and second outputs operatively connected to the first and second inputs, respectively, via first and second current paths, respectively; and a third current path configured to periodically connect the first and second current paths, thereby interrupting the second alternating current and reducing an average level thereof.

Thus, the apparatus can provide a way of controlling power provided, for example, to a plurality of devices.

The third current path may be configured to connect the first and second current paths for a whole number of cycles of the first alternating current.

According to a ninth aspect of the present invention, there is provided apparatus comprising: first and second inputs for receiving a first high-frequency alternating current and voltage; first and second outputs for providing a second high-frequency alternating current and voltage, the first and second outputs operatively connected to the first and second inputs, respectively, via first and second current paths, respectively; and a third current path configured to connect the first and second current paths for a controllable fraction of each of a plurality of half cycles of the first alternating voltage, thereby controllably delaying the second alternating voltage relative to the second alternating current and controllably reducing the power factor associated therewith.

Thus, the apparatus can provide another way of controlling power provided, for example, to a plurality of devices.

The fraction may begin at or near each zero crossing of the first alternating voltage. The apparatus may be configured to determine the fraction by comparing a signal indicative of the power associated with the second alternating current and voltage with a control signal.

There may be provided a system comprising: a cable; a supply configured to provide a high-frequency alternating current to the cable, wherein the cable forms a completed circuit for the alternating current; and one or more devices, wherein each of the one or more devices comprises apparatus according to any one of the first to sixth aspects of the present invention and is operatively connected to the cable so that a part of the cable forms the primary winding.

The supply may comprise apparatus according to the seventh aspect of the present invention.

The system may comprise a power modifier which comprises apparatus according to the eighth or ninth aspect of the present invention and is configured to receive a first high-frequency alternating current from the supply via a first part of the cable and to provide a second high-frequency alternating current to a second part of the cable.

The system may comprise a plurality of power modifiers, wherein each power modifier comprises apparatus according to the eighth or ninth aspect of the present invention and is configured to provide a different high-frequency alternating current to a different part of the cable, each different part of the cable forming a completed circuit for the different alternating current, wherein the supply and the plurality of power modifiers are interconnected so as to form a completed circuit for a high-frequency alternating current provided by the supply.

Thus, power provided to devices can be controlled differently for each of a plurality of different set of devices.

According to a tenth aspect of the present invention, there is provided a system for distributing electrical power via a conductor to one or more devices, each device configured to selectively forward power to a load in dependence upon a signal carried by the conductor simultaneously with the electrical power.

Thus, the loads can be switched off centrally, e.g. by a power supply, without stopping power distribution via the conductor, and without separate signalling connections to the devices.

According to an eleventh aspect of the present invention, there is provided a system for distributing electrical power via a conductor to one or more devices, each device configured to forward power to at least one of one or more loads, wherein the system comprises one or more further devices, each further device configured, in response to determining that the power is not being distributed via the conductor, to provide power to at least one of the one or more loads.

Thus, the further device can automatically provide power to the loads when power is not being distributed via the conductor, for example during a power failure. In certain applications, the further devices correspond to emergency lighting devices.

Each further device may be configured to monitor the power provided by a device to a load and, when providing power to the load, to provide a power corresponding to a predetermined fraction of the maximum power provided by the device. Each further device may be configured to obtain power from the conductor, to store the obtained power, and to provide the stored power to the load. Each device may be configured to selectively forward power to a load in dependence upon a signal carried by the conductor simultaneously with the electrical power.

In the system according to the tenth or eleventh aspect of the present invention, the power may distributed as a high-frequency alternating current; and the one or more devices and, where present, the one or more further devices may comprise apparatus configured to inductively couple to the conductor to obtain power therefrom.

In any one of the first to eleventh aspects of the present invention, the alternating current may have a frequency of at least 10 kilohertz.

BRIEF DESCRIPTION OF THE DRAWINGS

Certain embodiments of the present invention will now be described, by way of example, with reference to the accompanying drawings, in which:

FIG. 11b illustrates control circuitry included in the coupler of FIG. 11a;

FIG. 14b illustrates control circuitry included in the power modifier of FIG. 14a;

FIG. 16b illustrates control circuitry included in the power modifier of FIG. 16a;

DETAILED DESCRIPTION OF THE CERTAIN EMBODIMENTS

System 1

Figure 1:
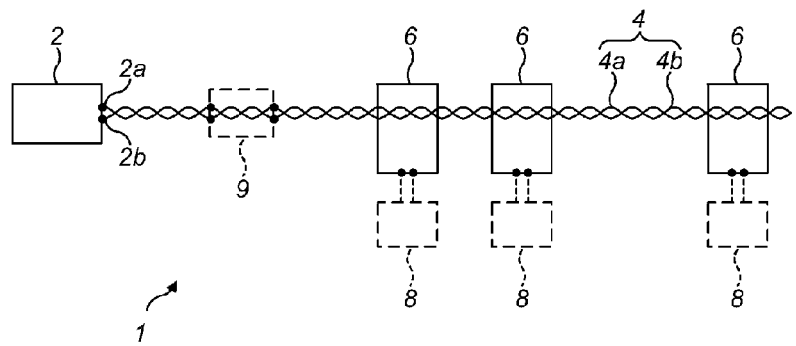
FIG. 1 illustrates a system for distributing power.

Referring to FIG. 1, a system 1 for distributing power will first be described. The system 1 includes a power supply 2, a power cable 4 operatively connected to the power supply 2, and several couplers 6, each of which is operatively connected to the power cable 4 and to a load 8. The load 8 preferably includes one or more LEDs. In this example, there are three couplers 6, although there may be any number of one or more couplers 6.

The power supply 2 is configured to supply high-frequency AC power. In this example, the frequency of the power supplied by the power supply 2 (hereinafter referred to as the "power frequency") is 50 kilohertz. However, the power frequency may be any frequency, for example between 10 and 200 kilohertz. The power supply 2 supplies a regulated current. In this example, the current is regulated at 1.9 amperes root mean square (RMS), although the current may be regulated at a different value. The power supply 2 includes first and second terminals 2a, 2b (hereinafter referred to as "power supply terminals") for supplying the power. The power supply 2 is preferably mains powered.

The power cable 4 includes a twisted pair of first and second conductors 4a, 4b. At one end of the power cable 4, the first and second conductors 4a, 4b are electrically connected (hereinafter referred to as "connected") to the first and second power supply terminals 2a, 2b, respectively. At the other end of the power cable 4, the first and second conductors 4a, 4b are connected to each other, i.e. shorted. Accordingly, the conductors 4a, 4b form a completed circuit for the current provided by the power supply 2 (hereinafter referred to as the "cable current").

The couplers 6 are each connected to the power cable 4 by way of an inductive connection, rather than, for example, a direct electrical connection. The connection can be called "contactless". Thus, the system 1 can be easier and safer to install and maintain. The couplers 6 are each configured to obtain high-frequency AC power from the power cable 4, rectify the high-frequency AC power, and provide direct current (DC) power to the load 8 to which the coupler 6 is operatively connected.

The system 1 may also include an optional power modifier 9. The power modifier 9 is configured to modify the high-frequency AC power in a part or all of the power cable 4. Hence, the amount of power coupled to the LEDs 8 in the part or all of the power cable 4 can be modified accordingly.

First Type of Coupler 6'

Figure 2:
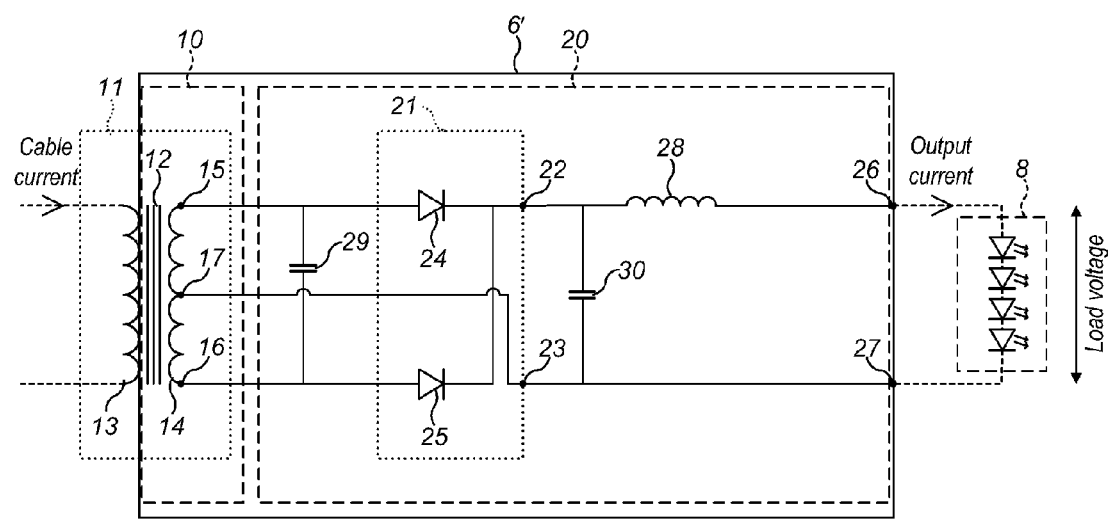
FIG. 2 illustrates a type of coupler which may be included in the system of FIG. 1.

Referring to FIG. 2, a first type of coupler 6' (hereinafter referred to as a "first coupler") will now be described. The first coupler 6' includes a part 10 (hereinafter referred to as a "power-obtaining part") for obtaining high-frequency AC power from the power cable 4 and a part 20 (hereinafter referred to as a "power-providing part") for rectifying the high-frequency AC power and providing DC power to the load 8.

The power-obtaining part 10 is configured to be inductively coupleable to the power cable 4, thereby forming a transformer 11. The power-obtaining part 10 includes an element which forms the core 12 of the transformer 11. The core 12 is preferably a splittable two-part ferrite core as described in WO 2013/083949 A2. The core 12 preferably has first and second channels (not shown). A length of the first conductor 4a of the power cable 4 can be located in the first channel, and a length of the second conductor 4b of the power cable 4 can be located in the second channel. These lengths form the primary winding 13 of the transformer 11. The primary winding 13 corresponds to a winding with one turn. In this example, the primary winding 13 has an inductance of 60 microhenrys, although it may have a different inductance. The power-obtaining part 10 also includes a conductor which forms the secondary winding 14 of the transformer 11. The secondary winding 14 includes first and second outer taps 15, 16, and a centre tap 17. Accordingly, the transformer 11 is a centre-tapped transformer. The number of turns in the secondary winding 14 determines the level of the current provided to the load 8. The secondary winding 14 preferably has a small, even number of turns, for example two, four or six turns, although it may have a different number of turns.

The power-providing part 20 includes a rectifier 21. The rectifier 21 is connected to the taps 15, 16, 17 of the secondary winding 14 of the transformer 12. The rectifier 21 includes first and second outputs 22, 23 (hereinafter referred to as "rectifier outputs"). The rectifier 21 includes first and second diodes 24, 25. The first diode 24 has a first terminal connected to the first outer tap 15, and a second terminal connected to the first rectifier output 22. The second diode 25 has a first terminal connected to the second outer tap 16, and a second terminal connected to the first rectifier output 22. The diodes 24, 25 are preferably nominally the same. In this example, the diodes 24, 25 are orientated to allow current in a direction towards the first rectifier output 22. In other examples, the diodes 24, 25 may be oppositely orientated. The centre tap 17 is directly connected (i.e. not via any circuit elements) to the second rectifier output 23. In other examples, the diodes 24, 25 may be connected to the second rectifier output 23 instead of the first rectifier output 22, and the centre tap 17 may be connected to the first rectifier output 22 instead of the second rectifier output 23.

The first and second rectifier outputs 22, 23 are directly or indirectly connected to first and second outputs 26, 27, respectively, of the power-providing part 20 (hereinafter referred to as the "main outputs"). In particular, the first rectifier output 22 is connected to a first terminal of an inductor 28 whose second terminal is connected to the first main output 26. The second rectifier output 22 is directly connected to the second main output 27. The second main output 27 defines zero volts or ground. In other examples, the inductor 28 may instead be provided between the second rectifier output 23 and the second main output 27.

As will be appreciated, the first and/or second rectifier outputs 22, 23 need not constitute discrete structural features. For example, the centre tap 17 may be directly connected to the second main output 27 by means of a continuous conductor (e.g. track).

The load 8 is connected between the first and second main outputs 26, 27. In this example, the load 8 includes four LEDs. However, the load 8 may include any number of one or more LEDs. When a high-frequency AC current (i.e. the cable current) is present in the power cable 4, the power-providing part 20 provides a DC current (hereinafter referred to as an "output current") to the load 8. Because the cable current is regulated by the power supply 2, the output current, and the brightness of the LEDs, is also regulated.

The inductor 28 is configured to smooth the current provided by the rectifier (hereinafter referred to as the "rectifier current"). The inductor 28 preferably has the same or a similar reactance (e.g. to within 50%) as the total reactance of the first and second capacitors 29, 30 which are described in more detail below. Thus, the ripple of the output current can be reduced to a suitable level (e.g. less than 20%) at a reasonable cost.

The power-providing part 20 also includes first and second capacitors 29, 30. The first capacitor 29 is connected to the secondary winding 14, and the second capacitor 30 is connected, via the rectifier 21, to the secondary winding 14. In particular, the first capacitor 29 has first and second terminals connected to the first and second outer taps 15, 16, respectively. The second capacitor 30 has first and second terminals connected to the first and second outputs 22, 23, respectively, of the rectifier 21. Accordingly, the first terminal of the second capacitor 30 is connected via the first and second diodes 24, 25 to the first and second outer taps 15, 16, respectively. The second terminal of the second capacitor 30 is directly connected to the centre tap 17.

The first and second capacitors 29, 30 are configured to together provide a reactance referred to the primary winding 13 which substantially compensates for the reactance of the primary winding 13 (e.g. to within 20% or 10% or 5% or 1%). Accordingly, the capacitances $C_1$, $C_2$ of the first and second capacitors 29, 30, respectively, are selected to satisfy the following condition:

$$2\pi f L_P = \frac{1}{2\pi f C'} = \frac{1}{2\pi f [(2n)^2 C_1 + n^2 C_2]} \quad \text{[Equation 1]}$$

where f is the power frequency (e.g. 50 kilohertz), $L_p$ is the inductance of the primary winding 13 (e.g. 60 microhenrys), C' is an equivalent capacitance (e.g. 169 nanofarads), and 2n is the number of turns of the secondary winding 14 (e.g. two) or, more generally, the turns ratio of the transformer 11.

The first and second capacitors 29, 30 preferably provide substantially the same reactance referred to the primary winding 13 as each other (e.g. to within 20% or 10% or 5% or 1%). Accordingly, the capacitance $C_2$ of the second capacitor 30 is preferably selected to be equal to four times the capacitance $C_1$ of the first capacitor 29.

Providing the second capacitor 30 in addition to the first capacitor 29 to compensate for the inductance of the primary winding 13 can improve the performance of the first coupler 6' in two ways.

Firstly, the second capacitor 30 improves the stability of the output current with respect to changes in the impedance of the load 8. Accordingly, the first coupler 6' can be used with a wider range of different loads and/or with loads 8 with narrower current specifications. For example, the maximum change in the output current may be about 5% for changes in the voltage across the load (hereinafter referred to as the "load voltage") between a specified maximum load voltage (e.g. 24 volts) and a quarter of the maximum specified load voltage. This is compared with a maximum change of typically 20% if the second capacitor 30 is not provided, or typical 10% if the capacitance $C_2$ of the second capacitor 30 is substantially different from four times the capacitance $C_1$ of the first capacitor 29.

Secondly, the second capacitor 30 increases the efficiency of the rectifier 21, for reasons which will now be explained.

Figure 3:
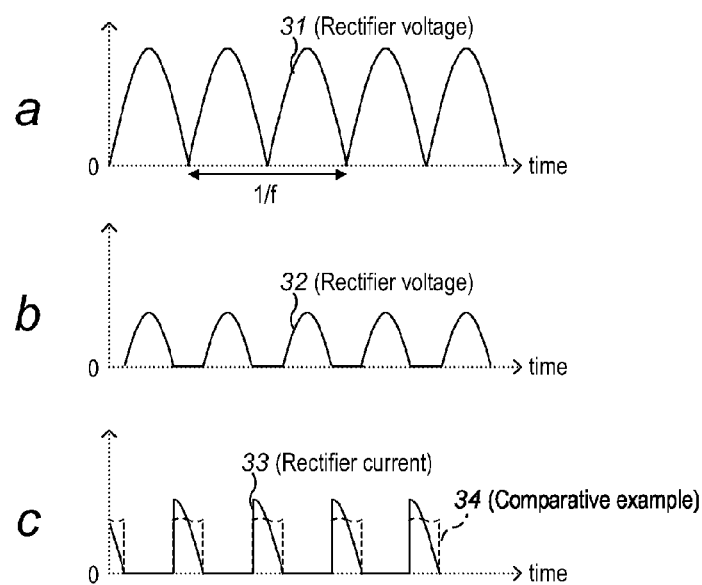
FIGS. 3a, 3b and 3c illustrate various voltage and current waveforms associated with a rectifier included in the coupler of FIG. 2.

Referring to FIG. 3a, when the load voltage is high, e.g. at or near to the specified maximum load voltage, the voltage across the rectifier outputs 22, 23 (hereinafter referred to as the "rectifier voltage") has a waveform 31 which corresponds to a rectified sine wave. The frequency of the rectifier voltage (hereinafter referred to as the "rectifier frequency") is equal to twice the power frequency.

Referring to FIG. 3b, generally, at load voltages below the specified maximum load voltage, the rectifier voltage has a waveform 32 which corresponds to a downwards-shifted rectified sine wave for a part of each cycle, and which is zero for the other part(s) of the cycle. The downwards shift, and the proportion of the cycle during which the rectifier voltage is zero, increases as the load voltage decreases. The shape of the waveform 32 is due to the diodes 24, 25 being biased by the inductor 28.

Referring to FIG. 3c, the current provided by the rectifier 21 (hereinafter referred to as the "rectifier current") has a waveform 33 which is zero during the part(s) of each cycle during which the rectifier voltage is non-zero and which abruptly increases to a maximum and then decreases to zero during the part of the cycle during which the rectifier voltage is zero. In a comparative example in which the first coupler 6' does not include the second capacitor 30, the rectifier current has a waveform 34 which does not decrease to zero, indicating that charge is being stored on the diodes 24, 25. Storing of charge on the diodes 24, 25 increases the reverse recovery time of the diodes 24, 25. Providing the second capacitor 30 fully or partly reduces the storing of charge on the diodes 24, 25, thereby decreasing the reverse recovery time of the diodes 24, 25 and increasing the efficiency of the rectifier 21.

Other Modifications of the First Type of Coupler 6'

It will be appreciated that many other modifications may be made to the first coupler 6'.

The first coupler 6' may be inductively coupleable to the power cable 4 in a different way. For example, the first coupler 6' may include a different type of core, or need not include a core.

The first coupler 6' may include a different type of rectifier 21. For example, instead of the diodes 23, 24, the rectifier 21 may include switches, e.g. field-effect transistors.

The first coupler 6' need not include the centre tap 17. In this case, the rectifier 21 may include a diode bridge. Furthermore, in this case, for the first and second capacitors 29, 30 to each provide substantially the same reactance referred to the primary winding, the capacitance $C_2$ of the second capacitor 30 is selected to be equal to the capacitance $C_1$ of the first capacitor 29.

However, the first coupler 6' with the centre-tapped transformer 11 can be more efficient than the first coupler 6' without the centre-tapped transformer. In both cases, because the transformer 11 generally has a single-turn primary winding 13, the core 12 is preferably configured such that the energy losses therein are considerably higher than the energy losses in the windings 13, 14. Therefore, decreased energy losses due to the secondary winding 14 requiring fewer turns in the first coupler 6' without the centre-tapped transformer 11 are less important than decreased energy losses due to the rectifier 21 requiring only two diodes 24, 25 in the first coupler 6' with the centre-tapped transformer 11.

The first coupler 6' may include further circuit elements, each of which may be connected to any other circuit elements.

Where appropriate, any of the hereindescribed modifications of the other types of coupler 6 may also be made to the first coupler 6'.

Second Type of Coupler 6"

Figure 4:
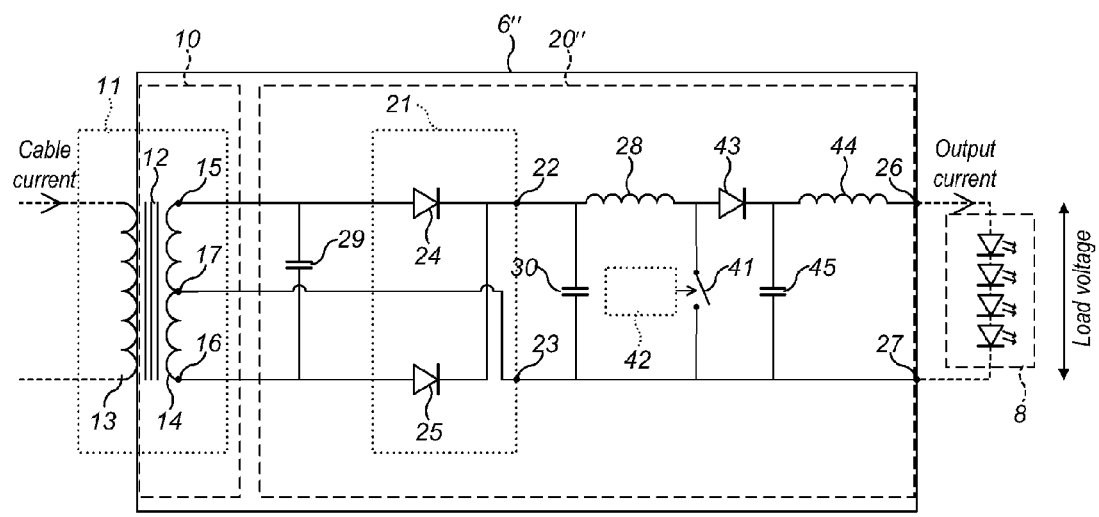
FIG. 4 illustrates another type of coupler which may be included in the system of FIG. 1.

Referring to FIG. 4, a second type of coupler 6" (hereinafter referred to as a "second coupler") will now be described. The second coupler 6" includes the same features as the first coupler 6'. The second coupler 6" also includes several further features.

In particular, the power-providing part 20" of the second coupler 6" includes a switch 41 which is configured to periodically interrupt the rectifier current. In particular, the switch 41 is configured to periodically complete a low-impedance current path, i.e. a short circuit, between the first and second rectifier outputs 22, 23. The switch 41 has a first terminal which is connected to the second terminal of the inductor 28 (whose first terminal is connected to the first rectifier output 22), and a second terminal which is connected to the second rectifier output 23. The switch 41 preferably includes a metal-oxide-semiconductor field-effect transistor (MOSFET). However, the switch 41 may include a different type of switching element. The switch 41 has a gate terminal connected to control circuitry 42. The control circuitry 42 is configured to control the voltage at the gate terminal of the switch 41 and hence whether the switch 41 is in a conductive state ("closed") or a non-conductive state ("open"). The switch 41 is preferably operated (e.g. closed and then opened) with a frequency (hereinafter referred to as the "switch frequency") equal to the rectifier frequency. However, the switch frequency may be a multiple of (e.g. twice) the rectifier frequency, or a factor of (e.g. half) the rectifier frequency. The switch 41 is closed for a specified fraction of the time, which may be pre-set and/or controllable. For example, the second coupler 6" may be configured to receive an analogue control signal which determines the fraction of the time during which the switch 41 is closed. The control circuitry 42 is suitably configured to sense the rectifier frequency and/or power frequency. For example, the control circuitry 42 may be connected to a voltage or current sensor (not shown) configured to measure the rectifier voltage or current, or may be connected to a further secondary winding (not shown) of the transformer 11.

The power-providing part 20" of the second coupler 6" includes a third diode 43 configured to prevent a current flowing back from the load 8 through the switch 41 when the switch 41 is closed. The third diode 43 has a first terminal (anode) which is connected to the first terminal of the switch 41 and a second terminal (cathode) which is indirectly connected to the first main output 26. However, the third diode 42 may be orientated differently and/or connected differently, e.g. between the second terminal of the switch 41 and the second main output 27.

The power-providing part 20" of the second coupler 6" preferably includes a further inductor 44 and a further capacitor 45 together configured to provide a smoothed output current. However, the second coupler 6" may include different circuitry for smoothing the output current.

Figure 5:
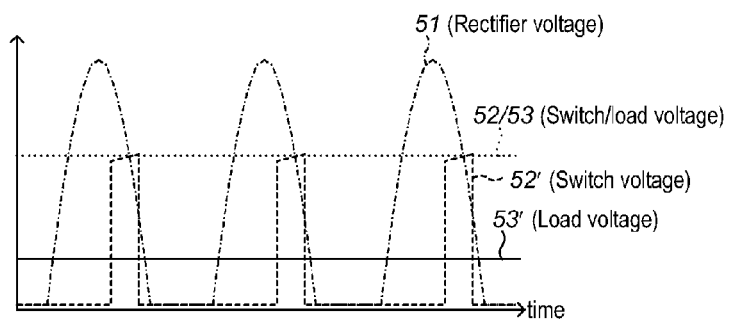
FIG. 5 illustrates various voltage waveforms associated with the coupler of FIG. 4.

Referring to FIG. 5, the rectifier voltage generally has a waveform 51 which corresponds to a downwards-shifted rectified sine wave for a part of each cycle, and which is zero for the other part(s) of the cycle. This is the same as the first coupler 6'. If the switch 41 is open for a long period of time, then the voltage across the switch 41 (hereinafter referred to as the "switch voltage") has a waveform 52 which is substantially constant. In this case, the load voltage is equal to the switch voltage. If the switch 41 is open for a part (e.g. 30%) of each cycle of the rectifier voltage and closed for the remaining part (e.g. 70%) of the cycle, then the switch voltage has a waveform 52' which is broadly constant (although, due to charging of the further capacitor 45, gradually increases towards the level associated with the switch being open for a long period of time) when the switch 41 is open and which is equal to zero when the switch 41 is closed. In this case, the load voltage, which is a smoothed version of the switch voltage, has a waveform 53' which is substantially constant at a level equal to a fraction (e.g. 30%) of the level of the switch voltage.

In this way, by controlling the fraction of time during which the switch 41 is open, e.g. between 0% and 100%, the level of the output current can be controlled, e.g. between 0% and 100% of a maximum output current. The maximum output current is determined by the cable current, which is regulated, and the properties of the transformer 11, e.g. the turns ratio. Accordingly, the maximum output current is generally fixed. The fraction of time during which the switch 41 is closed may be pre-set so that the output current can be adjusted to a specified value based on the requirements of a particular type of load 8 with which the second coupler 6" is to be used. The fraction of time during which the switch 41 is closed may be controllable to enable LEDs 8 connected to the second coupler 6" to be controllable dimmed.

Thus, the second coupler 6" can provide a way of controlling power provided to the load 8. Moreover, this can be done without producing unsuitable voltage harmonics in the transformer 11 and hence in the power cable 4. This is because the switch 41 is suitably isolated from transformer 11. In contrast, in a coupler 6 in which a rectifier is used to control the power provided to the load 8, voltage harmonics in the transformer 11 and hence in the power cable 4 can be produced. Voltages harmonics in the power cable 4 can adversely affect the stability of the output current from each of the couplers 6 connected to the power cable 4.

Moreover, in the second coupler 6", the switch frequency is selected to substantially avoid any amplitude modulation of the cable current.

Further Modifications of the Second Type of Coupler 6"

It will be appreciated that many other modifications may be made to the second coupler 6".

The second coupler 6" need not include the second capacitor 30. However, in this case, the abovedescribed advantages of the second capacitor 30, for example improved stability of the output current with respect to changes in the impedance of the load, would not be obtained.

Where appropriate, any of the hereindescribed modifications of the other types of coupler 6 may also be made to the second coupler 6".

Third Type of Coupler 6'''

Figure 6:
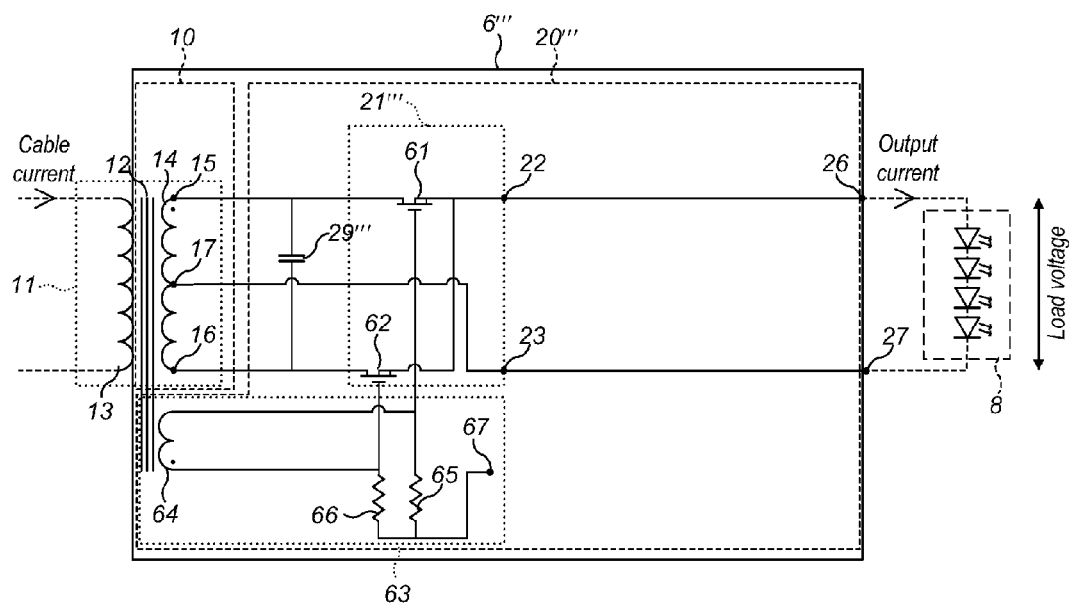
FIG. 6 illustrates another type of coupler which may be included in the system of FIG. 1.

Referring to FIG. 6, a third type of coupler 6''' (hereinafter referred to as a "third coupler") will now be described. The third coupler 6''' includes the same features as the first coupler 6', with the following exceptions.

The rectifier 21''' of the third coupler 6''' is a synchronous rectifier and includes first and second switches 61, 62 instead of the first and second diodes 23, 24, respectively. The switches 61, 62 preferably include MOSFETs. However, the switches 61, 62 may include different types of switching elements. The switches 61, 62 are preferably nominally the same. The switches 61, 62 each have a gate terminal connected to control circuitry 63.

The control circuitry 63 includes, or is connected to, a further secondary winding 64 of the transformer 11. The further secondary winding 64 has a first terminal which is connected to the gate terminal of the first switch 61, and has a second terminal which is connected to the gate terminal of the second switch 62. The gate terminals of the first and second switches 61, 62 are also connected via first and second resistors 65, 66, respectively, to a control port 67. The first and second resistors 65, 66 are preferably nominally the same.

When the voltage at the control port 67 (hereinafter referred to as the "control voltage") is at a low level (between, say, 0 and 0.5 volts) and a cable current is present in the primary winding 13, the rectifier 21''' provides a rectifier current and the third coupler 6''' provides an output current. The further secondary winding 64 is configured to provide voltages to the gate terminals of the switches 61, 62 (hereinafter referred to as "gate voltages") which cause the first switch 61 to close and the second switch 62 to open during e.g. the positive-current half of each cycle of the cable current, and cause the first switch 61 to open and the second switch 62 to close during e.g. the negative-current half of each cycle of the cable current.

The gate voltages provided by the further secondary winding 64 should be at a suitable level. In particular, they should be above threshold voltages of the switches 61, 62 during the appropriate half cycle of the cable current, and also below maximum safe gate voltages to avoid damage to the switches 61, 62. The gate voltages provided by the further secondary winding 64 depend upon properties of the further secondary winding 64 and the voltages across the other windings 13, 14 of the transformer 11, which, in turn, depend upon the load voltage. Accordingly, in order for the further secondary winding 64 to provide gate voltages at a suitable level, the properties of the further secondary winding 64, e.g. the number of turns therein, should be matched to the load 8 with which the third coupler 6''' is to be used.

When the control voltage is at a high level (between, say, 5 and 12 volts), the rectifier 21''' does not provide a rectifier current and the third coupler 6''' does not provide an output current. Due to the control voltage, the gate voltages at the switches 61, 62 are above threshold voltages of the switches 61, 62 regardless of the voltages provided by the further secondary winding 64. Accordingly, the switches 61, 62 are both closed and the rectifier 21''' provides a low-impedance current path between the outer taps 15, 16 of the secondary winding 14, and does not provide a rectifier current.

The control voltage can be set in any suitable way. For example, the control port 67 may be connected to the common terminal of a single-pole double-throw (SPDT) switch which, in a first position, is directly connected to the second main output 27, i.e. to ground, and which, in a second position, is connected to a DC voltage source, e.g. a battery. As another example, the control voltage may be set by way of another type of user interface or a communications interface configured to communicate with a remote device.

Thus, the control circuitry 63 can provide a cost-effective way of controlling the switches 61, 62 in the rectifier 21''' and of switching the rectifier 21''' on or off.

The power-providing part 20''' of the third coupler 6''' does not include the inductor 28 or the second capacitor 30 which are included in the first coupler 6'. Accordingly, the first and second rectifier outputs 22, 23 are directly connected to the first and second main outputs 26, 27, respectively. Because the second capacitor 30 is not included, the capacitance $C_1$ of the first capacitor 29''' is preferably selected so that the first capacitor 29''' alone provide a reactance referred to the primary winding 13 which substantially compensates for the reactance of the primary winding 13.

Not including the inductor 28 decreases the cost of the third coupler 6''', without unduly decreasing the overall efficiency. This is for reasons which will now be explained.

Figure 7:
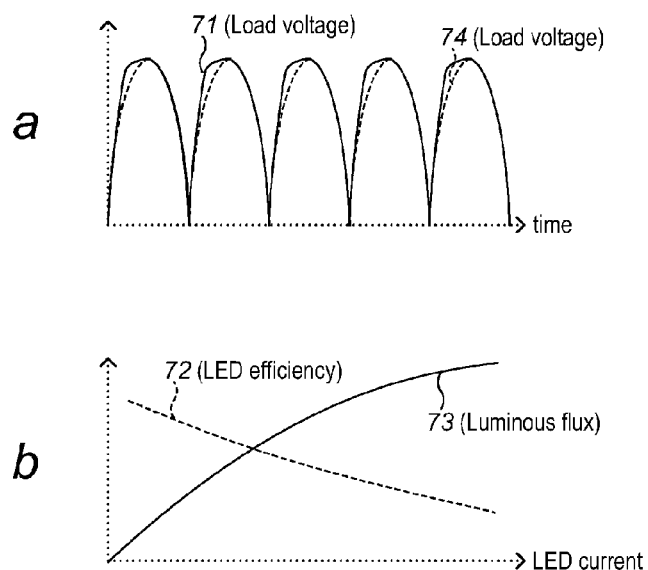
FIG. 7a illustrates a waveform of a voltage across an LED load connected to the coupler of FIG. 6.
FIG. 7b illustrates efficiency and luminous flux of an LED as a function of the current therein.

Referring to FIG. 7a, the third coupler 6''' provides a load voltage with a waveform 71 which is similar to a rectified sine wave except for regions (hereinafter referred to as "voltage irregularities") before each peak where the load voltage is increased relative to the rectified sine wave. The voltage irregularities are due to the constant-current nature of the system 1, and the non-linear current-voltage characteristics of the LEDs around the point at which they become conductive. Referring to FIG. 7b, the efficiency 72 of a typical LED (hereinafter referred to as the "LED efficiency") is generally a decreasing function of the current in the LED (hereinafter referred to as the "LED current"). Hence the luminous flux 73 emitted by a typical LED is an increasing function of the LED current, wherein the rate of increase is a decreasing function of the LED current. Accordingly, a varying LED current (as provided by the third coupler 6''') will lead to a lower LED efficiency than a constant LED current that produces the same luminous flux. The efficiency may be, for example, between 2% and 6% lower. However, because the third coupler 6''' does not need to include an inductor, there are no associated energy losses, and the efficiency with which the third coupler 6''' converts the AC electrical power in the power cable 4 into DC electrical power can be higher, for example by between 1% and 4%. Therefore, any decrease in the overall efficiency can be relatively small.

Thus, the third coupler 6''' can be a cost-efficient and energy-efficient way of providing power to a specified load 8.

As will be appreciated, the third coupler 6''' is particularly suitable for large-scale applications involving large numbers of LED lighting units.

Further Modifications of the Third Type of Coupler 6'''

It will be appreciated that many other modifications may be made to the third coupler 6'''.

The rectifier 21''' of the third coupler 6''' may include diodes instead of the switches 61, 62. However, switches 61, 62 can be more efficient because they have lower voltage drops across them.

The control circuitry 63 of the third coupler 6''' may be different. For example, the control circuitry 63 need not include a control port 67, and instead there may simply be a connection to ground.

Where appropriate, the third coupler 6''' may include any of the features of the first and second couplers 6', 6".

Where appropriate, any of the hereindescribed modifications of the other types of coupler 6 may also be made to the third coupler 6'''.

Arrangement 80

Figure 8:
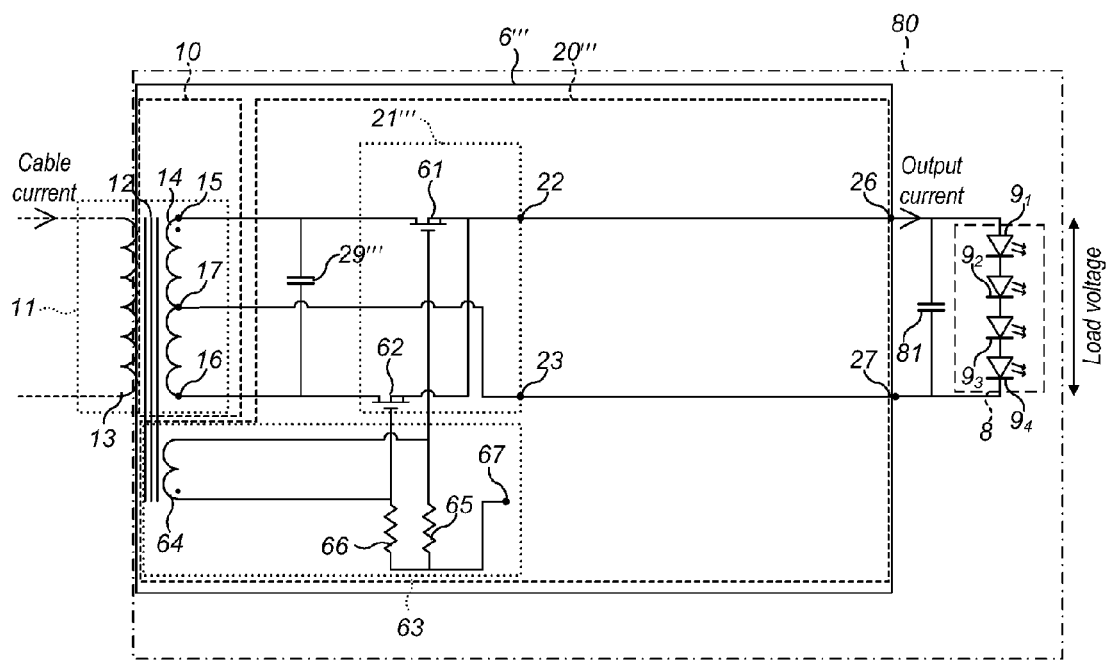
FIG. 8 illustrates an arrangement including the coupler of FIG. 6.

Referring to FIG. 8, an arrangement 80 including the third coupler 6''' will now be described. The arrangement 80 includes a further capacitor 81 connected in parallel with the load 8. The further capacitor 81 may be associated with, e.g. integral with, the third coupler 6''' and/or the load 8. The further capacitor 81 is configured to reduce the rate at which the load voltage rises during each cycle thereof, thereby avoiding the abovedescribed voltage irregularities. The further capacitor 81 has a capacitance which is selected to be large enough to suitably reduce the rate at which the load voltage rises, while being small enough to suitably discharge during each cycle of the load voltage. The preferred capacitance is such that the voltage across the further capacitor 81 drops to close to (e.g. within 1% of) a minimum level for a small proportion (e.g. 1% of) each cycle of the load voltage. Thereafter, the load voltage rises again. Here, the "minimum level" corresponds to the voltage which would be present across the capacitor if the output current/load voltage were to be stopped for a long period of time (e.g. seconds). The preferred capacitance can be determined empirically. Typically, it may be several or several tens of nanofarads. In some examples, the capacitance may differ from the preferred capacitance, for example by up to 25%.

Referring once again to FIG. 7, when the further capacitor 81 is included, the load voltage has a more regular waveform 74 than the waveform 71 otherwise obtained. Thus, the arrangement 80 can reduce the voltage harmonics which may be produced in the power cable 4 by the third coupler 6'''. As explained above, voltages harmonics in the power cable 4 can adversely affect, for example, the stability of the output current from each of the couplers 6 connected to the power cable 4.

Further Modifications of the Arrangement 80

Figure 9:
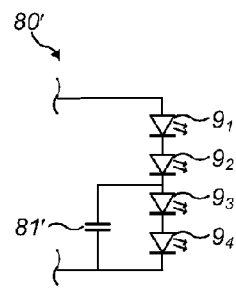
FIG. 9 illustrates a variation of the arrangement of FIG. 8.

The further capacitor 61 need not be connected in parallel with all the LEDs 9 which make up the load 8. For example, in the arrangement 80' illustrated in FIG. 9, the further capacitor 81' is connected in parallel with only two LEDs $9_3$, $9_4$ out of four LEDs $9_1$, $9_3$, $9_3$, $9_4$.

Fourth Type of Coupler 6''''

Figure 10:
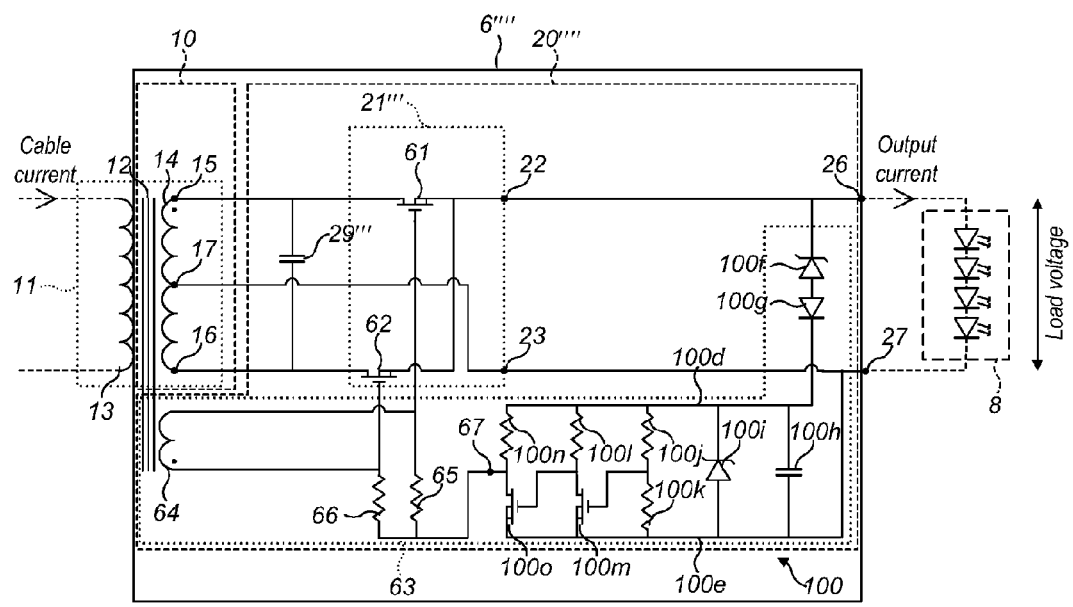
FIG. 10 illustrates another type of coupler which may be included in the system of FIG. 1.

Referring to FIG. 10, a fourth type of coupler 6'''' (hereinafter referred to as a "fourth coupler") will now be described. The fourth coupler 6'''' includes the same features as the third coupler 6'''. The fourth coupler 6'''' also includes subcircuitry 100 configured to provide a voltage at the control port 67, i.e. to provide the control voltage. The subcircuitry 100 provides a cut-off function in case of a fault (hereinafter referred to as a "load fault") such as a high load voltage or open circuit between the main outputs 26, 27. As will be explained in more detail below, when the load voltage is above a predetermined maximum load voltage when the rectifier 21''' is on, the control voltage provided by the subcircuitry 100 alternates between high and low levels, such that the rectifier 21''' is alternately switched off and on, respectively.

The subcircuitry 100 includes first and second conductors 100d, 100e (hereinafter referred to as "rails"). The first rail 100d is connected to the first main output via a first Zener diode 100f and a standard diode 100g. The first Zener diode 100f is orientated with its anode towards the first rail, while the diode 100g is orientated in the opposite way. The second rail 100e is connected to the second main output 27, i.e. to ground. The first and second rails 100d, 100e are interconnected by first, second, third, fourth and fifth current paths.

The first current path comprises a capacitor 100h. The second current path comprises a second Zener diode 100i, orientated with its anode towards the second rail 100e. The third current path comprises first and second resistors 100j, 100k connected in series. The fourth current path comprises a third resistor 100l and the channel of a third MOSFET 100m connected in series. The fifth current path comprises a fourth resistor 100n and the channel of a fourth MOSFET 100o connected in series. The gate terminal of the third MOSFET 100m is connected to a point in the third current path intermediate to the first and second resistors 100j, 100k. The gate terminal of the fourth MOSFET 100o is connected to a point in the fourth current path intermediate to the third resistor 100l and the third MOSFET 100m. The control port 67 is connected to a point in the fifth current path intermediate to the fourth resistor 100 and the fourth MOSFET 100o.

While the load voltage remains below the predetermined maximum load voltage, voltages in the subcircuitry 100 are at a low level, the control voltage is at a low level, and the rectifier 21''' remains on.

When a load fault occurs and the rectifier 21''' is on, the voltage across the first Zener diode 100f exceeds the breakdown voltage of the first Zener diode 100f, and current flows through the first Zener diode 100f and charges the capacitor 100h. Accordingly, the voltage of the first rail 100d increases, up to a value defined by the breakdown voltage of the second Zener diode 100i. This causes the third MOSFET 100m to close, and the fourth MOSFET 100o to open. Accordingly, the control voltage goes to a high level and the rectifier 21''' is switched off. These events occur in a period of time which depends upon the amount of current flowing through the first Zener diode 100e and the capacitance of the capacitor 100h. In some examples, the period of time is a number of, e.g. 20, microseconds. However, it may be longer or shorter than this.

When the rectifier 21''' is switched off, current does not flow through the first Zener diode 100f, and the capacitor 100h discharges, decreasing the voltage of the first rail 100d until it reaches an intermediate level (e.g. 8 volts) at which the third MOSFET 100m is caused to switch off. The intermediate level depends, for example, upon the ratio of the resistances of the first and second resistors 100j, 100k and the gate voltage of the third MOSFET 100m. These events occur in a period of time which depends upon the resistances of the first, second and third resistors 100j, 100k, 100l, primarily the third resistor 100l, and the capacitance of the capacitor 100h. In some examples, the period of time is a number of, e.g. 100, milliseconds. However, it may be longer or shorter than this.

When the third MOSFET 100m begins to open, this causes the fourth MOSFET 100o to begin to close, which decreases the voltage of the first rail and thus accelerates the opening of the third MOSFET 100m, and so on. Accordingly, the voltage of the first rail 100d decreases very rapidly, e.g. in a few, e.g. 5, microseconds, from the intermediate level to the low level. The control voltage does the same.

Thus, firstly, the switches 61, 62 in the rectifier 21''' are switched relatively quickly and so are only in transition states for relatively short periods of time, e.g. 5 microseconds. Therefore, the risk of damage to the switches 61, 62 due to power dissipation in the transition states is reduced.

Secondly, the first Zener diode 100f, which is used to dissipate power during a load fault, only carries a current for a relatively small fraction, e.g. less than one-thousandth, of the time, and so can have a lower power rating and can be provided at lower cost than would otherwise be the case.

Further Modifications of the Fourth Type of Coupler 6''''

It will be appreciated that many other modifications may be made to the fourth coupler 6''''. Where appropriate, any of the hereindescribed modifications of the other types of coupler 6 may also be made to the third coupler 6''''.

The fourth coupler 6'''' may be used in the arrangement 80.

Fifth Type of Coupler 6*

Figure 11A:
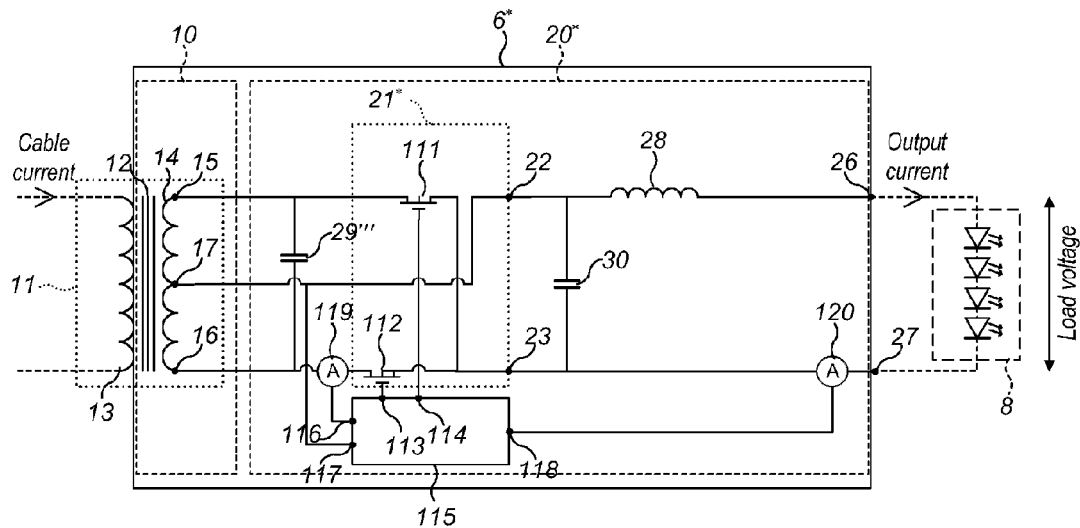
FIG. 11a illustrates another type of coupler which may be included in the system of FIG. 1.

Referring to FIG. 11a, a fifth type of coupler 6* (hereinafter referred to as a "fifth coupler") will now be described. The fifth coupler 6* includes the same features as the first coupler 6', with the following exceptions. The rectifier 21* of the fifth coupler 6* is a synchronous rectifier, and includes first and second switches 111, 112 instead of the first and second diodes 23, 24, respectively. The switches 111, 112 preferably include MOSFETs. However, the switches 111, 112 may include different types of switching elements. In the fifth coupler 6*, the centre tap 17 is connected to the first rectifier output 22, and the switches 111, 112 are connected to the second rectifier output 23. The fifth coupler 6* also includes control circuitry 115. As will be explained in more detail below, the control circuitry 115 is configured to cause the rectifier 21* to rectify the alternating current from the secondary winding 14 and also to provide a low-impedance current path, i.e. a short circuit, between the outer taps 15, 16 of the secondary winding 14 for a controllable fraction of each half cycle of the rectifier voltage. This delays the rectifier voltage relative to the rectifier current and reduces an average level of the output current.

The control circuitry 115 has first and second outputs 113, 114 connected to gate terminals of the first and second switches 111, 112, respectively. The control circuitry 115 has first, second and third inputs 116, 117, 118. The first input 116 is connected to a current sensor 119 configured to sense the alternating current provided to the second switch 112. The second input 117 is connected to the first rectifier output 22 to sense the rectifier voltage. The third input 118 is connected to a current sensor 120 configured to sense the output current. In other examples, the control circuitry 115 may have different numbers of, and/or differently connected, inputs and/or outputs. For example, the first input 116 may be connected to a current sensor 119 configured to sense the alternating current provided to the first switch 111.

Figure 11B:
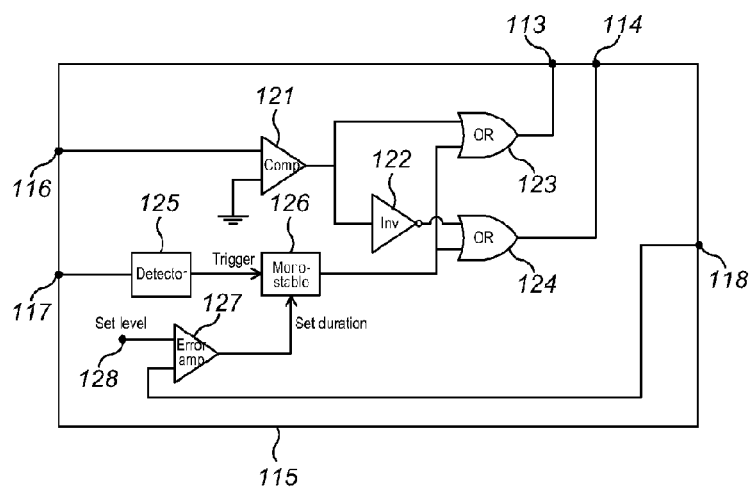
Figure 12:
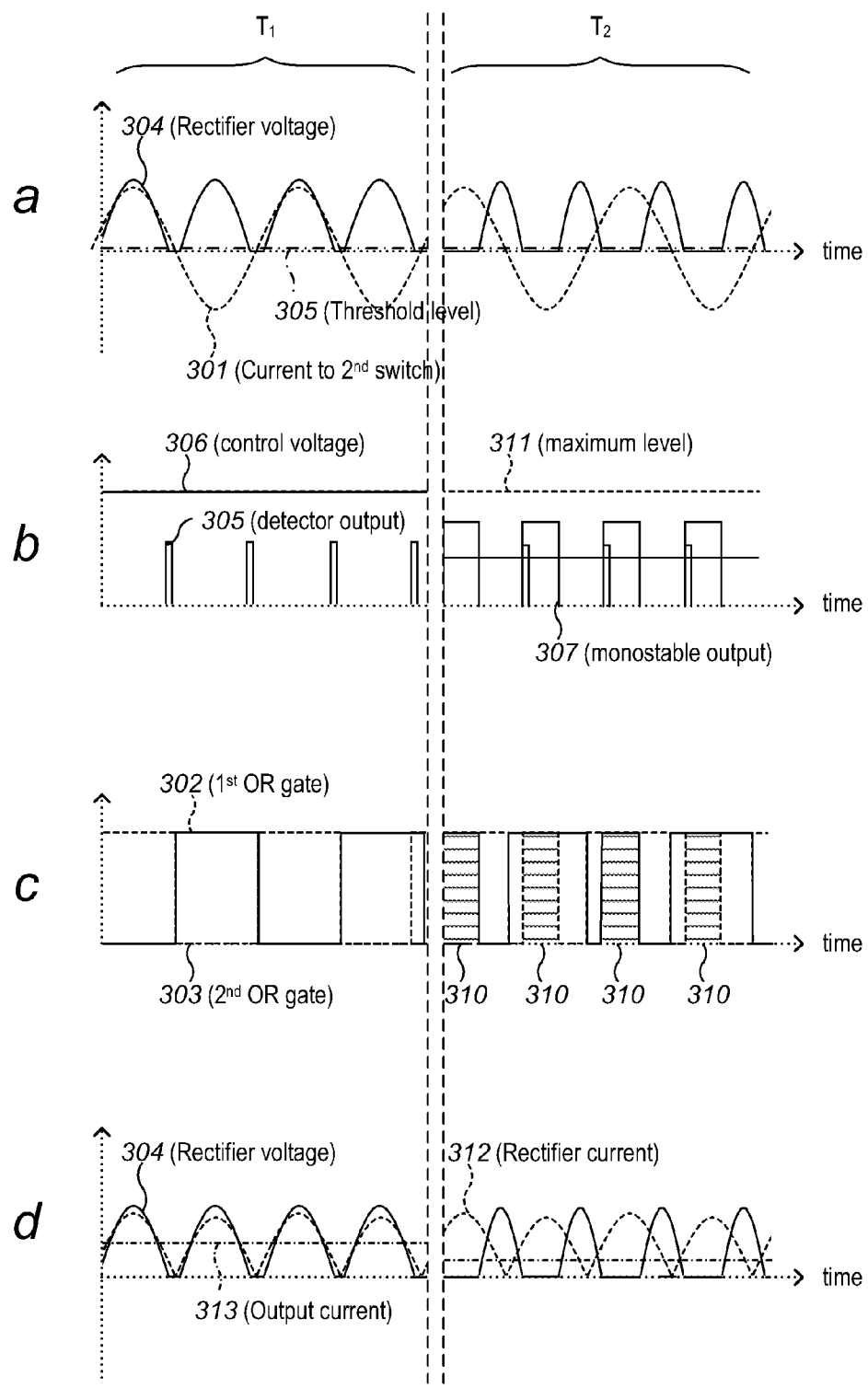
FIGS. 12a, 12b, 12c and 12d illustrate various current and voltage waveforms associated with the coupler of FIGS. 11a and 11b.

Referring also to FIG. 11b and FIG. 12, the control circuitry 115 and the associated voltages and currents will now be described in more detail.

The control circuitry 115 includes a comparator 121 having first and second inputs and an output. The first and second inputs to the comparator 121 are connected to the first input 116 to the control circuitry 115 and to ground, respectively. The comparator 121 is configured to provide at its output a voltage (not shown) which is high if the voltage 301 at the first input 116 to the control circuitry 115 (i.e. the voltage 301 corresponding to the alternating current provided to the second switch 112) is positive and low if the voltage 301 is negative. The control circuitry 115 also includes an inverter 122 having an input and an output, and first and second OR gates 123, 124 each having first and second inputs and an output. The output of the comparator 121 is connected to the first input to the first OR gate 123 and is also connected, via the inverter 122, to the first input to the second OR gate 124. The outputs of the first and second OR gates 123, 124 are connected to the first and second outputs 113, 114, respectively, of the control circuitry 115, i.e. to the gate terminals of the first and second switches 111, 112, respectively.

Accordingly, during a period $T_1$ when the voltages at the second inputs to the OR gates 123, 124 are zero, the OR gates 123, 124 provide voltages 302, 303 at their outputs which cause the first and second switches 111, 112 to be conductive in different half cycles of the alternating current provided to the second switch 112. In this case, the output current (see 313) provided by the fifth coupler 6* corresponds to a maximum level.

The control circuitry 115 also includes a detector 125 having an input and an output, monostable circuitry 126 having first and second inputs and an output, an error amplifier 127 having first and second inputs and an output, and a control port 128. The input to the detector 125 is connected to the second input 117 to the control circuitry 115. The detector 125 is configured to provide at its output a voltage pulse 305 (hereinafter referred to as a "trigger") whenever the voltage 304 at the second input 117 to the control circuitry 115 (i.e. the voltage 304 corresponding to the rectifier voltage) has decreased from above to below a small threshold level 305, i.e. has decreased to close to zero. The output of the detector 125 is connected to the first input to the monostable circuitry 126. The first and second inputs to the error amplifier 127 are connected to the control port 128 and to the third input 118 to the control circuitry 115, respectively. The error amplifier 127 is configured to provide at its output a voltage (not shown) indicative of the difference between the voltage 306 at the control port 128 (hereinafter referred to as the "control voltage") and the voltage 313 at the third input 118 to the control circuitry 115 (i.e. the voltage 313 corresponding to the output current). The control voltage 306 may be set in any suitable way, for example by way of a user interface or a communications interface configured to communicate with a remote device. The output of the error amplifier 127 is connected to the second input to the monostable circuitry 126. The monostable circuitry 126 is configured to provide at its output a voltage pulse 307 in response to a trigger 305 from the detector 125, wherein the duration of the voltage pulse 307 is a fraction of the period of the rectifier voltage and is a suitable, e.g. linear, function of the voltage (not shown) provided by the error amplifier 126. The output of the monostable circuitry 126 is connected to the second inputs to the OR gates 123, 124.

Accordingly, during a period $T_2$ when the control voltage 306 is below a maximum level 311 corresponding to a maximum output current, the OR gates 123, 124 provide voltages 302, 303 at their outputs which cause the switches 111, 112 to be simultaneously conductive for a fraction 310 of each cycle of the rectifier voltage 304, at the beginning of each cycle of the rectifier voltage 304. This provides a low-impedance current path between the first and second outer taps 15, 16 and causes the rectifier voltage 304 to be zero for the fraction 310 of the cycle. This delays the subsequent rise of the rectifier voltage 304 and hence delays the rectifier voltage 304 relative to the rectifier current 312. Accordingly, the power provided by the rectifier 21*, and hence the output current (see 313), is reduced from a maximum level, wherein the degree to which the power is reduced depends upon the control voltage 306.

Thus, the fifth coupler 6* can provide an another way of controlling power provided to the load 8. Moreover, the fifth coupler 6* can have a lower cost than, for example, the second coupler 6".

Further Modifications of the Fifth Type of Coupler 6*

It will be appreciated that many other modifications may be made to the fifth coupler 6*.

The control circuitry 115 may be configured to control the switches 111, 112 in a different way.

Where appropriate, any of the hereindescribed modifications of the other types of coupler 6 may also be made to the fifth coupler 6*.

The fifth coupler 6* may be used in the arrangement 80.

First Type of Power Supply 2'

Figure 13:
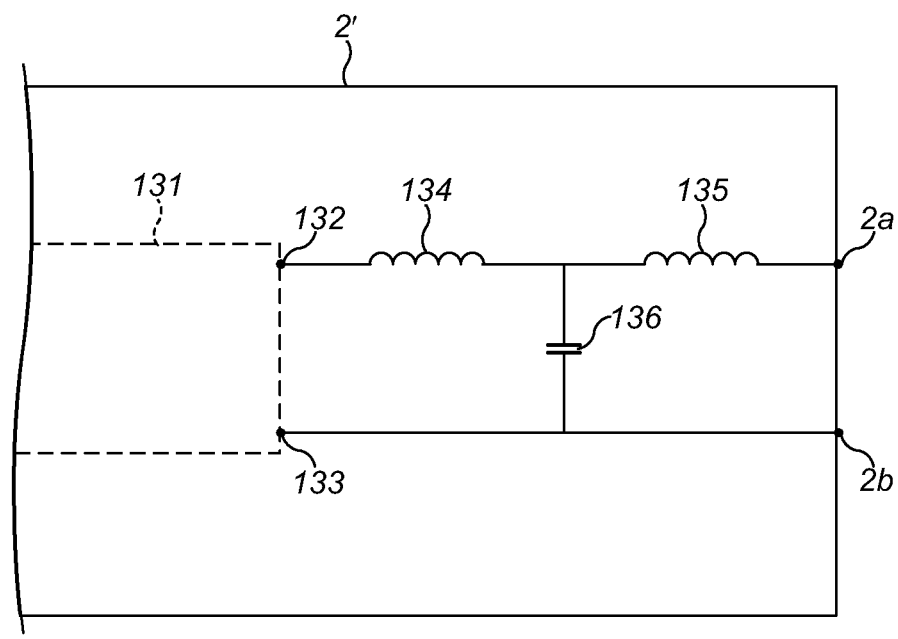
FIG. 13 illustrates a type of power supply which may be included in the system of FIG. 1.

Referring to FIG. 13, a first type of power supply 2' (hereinafter referred to as a "first power supply") will now be described.

The first power supply 2' may be used in a system 1 which includes any of the abovedescribed types of coupler 6. However, the first power supply 2' is particularly suitable for use in a system 1 which includes third, fourth and/or fifth couplers 6''', 6'''', 6*.

The first power supply 2' includes an inverter 131 configured to provide high-frequency AC power in the form of a square wave. The inverter 131 includes first and second outputs 132, 133 for the high-frequency AC power. The inverter 131 is preferably a half-bridge inverter. However, the inverter 131 may be a different type of inverter. The inverter 131 may be configured to provide a different waveform such as a sine wave. The first power supply 2' may include further parts (not shown), for example to convert mains power into DC power suitable for providing the inverter 131.

The first power supply 2' includes first and second inductors 134, 135 and a capacitor 136. The first output 132 of the inverter 131 is connected to the first power supply terminal 2a via a first current path which includes the first and second inductors 134, 135 connected in series. The second output 133 of the inverter 131 is directly connected to the second power supply terminal 2b via a second current path. The capacitor 136 has a first terminal connected to a point in the first current path intermediate the first and second inductors 134, 135, and a second terminal connected to the second current path.

The first inductor 134 is configured to act as an electrical ballast and to define the magnitude of the cable current for a given magnitude of voltage. The capacitor 136 is configured to provide, together with the first inductor 134, a resonant circuit with a resonance at a frequency (e.g. 46 kilohertz) below the power frequency (e.g. 50 kilohertz). This is so that the cable current is regulated over a relatively wide range of loads. This is explained in more detail in WO 2010/106375 A2.

The second inductor 135 is configured to reduce the harmonic distortion of the cable current due to couplers 6 (and/or loads 8) connected to the power cable 4. Even in response to a cable current which has a relatively low total harmonic distortion, the voltage across the primary winding 13 of the transformer 11 formed by the power cable 4 and the coupler 6 may have a high crest factor and/or may have a high total harmonic distortion. This is particularly so for the third, fourth and fifth couplers 6''', 6'''', 6*. Without the second inductor 135, the first power supply 2' has a low AC output impedance with the capacitor 136 and so voltage harmonics produced by the couplers 6 will cause corresponding cable current harmonics. The second inductor 135 effectively isolates the capacitor 136 from the couplers 6 and so reduces the total harmonic distortion of the cable current (e.g. to less than 10% or 5% or 1%). Accordingly, the output currents in the system 1, which depend upon the wave shape of the cable current, can be regulated more accurately.

First Type of Power Modifier 9'

Figure 14A:
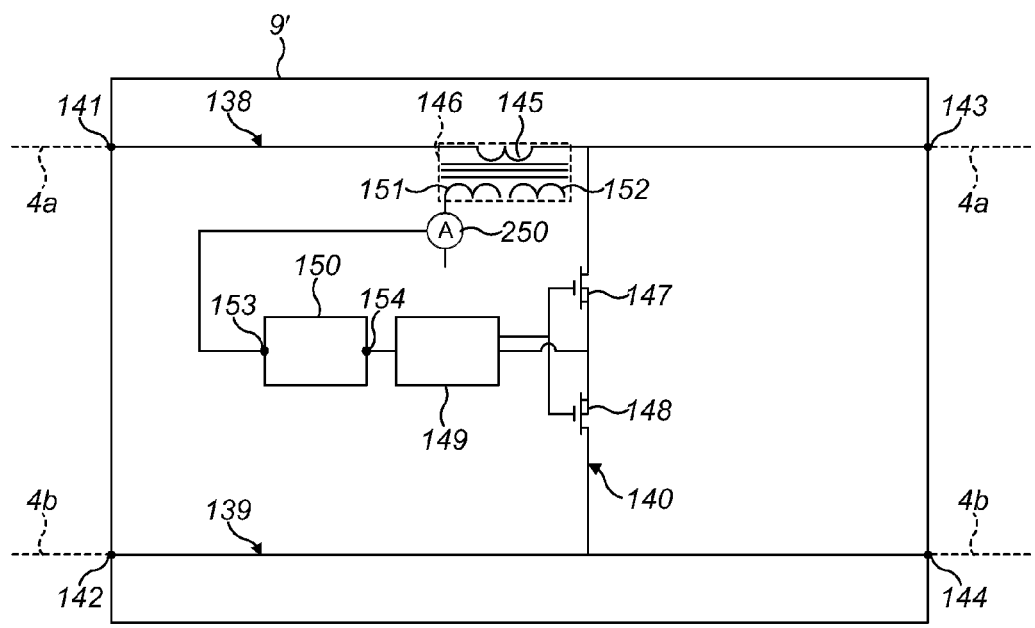
FIG. 14a illustrates a type of power modifier which may be included in the system of FIG. 1.

Referring to FIG. 14a, a first type of power modifier 9' (hereinafter referred to as a "first power modifier") will now be described.

The first power modifier 9' includes first and second inputs 141, 142, and first and second output 143, 144. The first and second inputs 141, 142 are connectable to first and second conductors 4a, 4b, respectively, at one end of a first part of a power cable 4, the other end of which is connected to the power supply 2. The first and second outputs 143, 144 are connectable to first and second conductors 4a, 4b, respectively, at one end of a second part of the power cable 4, at the other end of which the conductors 4a, 4b are shorted.

The current and voltage in the first part of the power cable 4 are hereinafter referred to as the "first cable current" and the "first cable voltage", respectively. The current and voltage in the second part of the power cable 4 are hereinafter referred to as the "second cable current" and the "second cable voltage", respectively.

The first input 141 is connected to the first output 143 via a first current path 138 which includes a winding 145 which forms the primary winding of a transformer 146. The second input 142 is directly connected to the second output 144 via a second current path 139. The first current path 138 is also connected to the second current 139 path via a third current path 140 which includes first and second switches 147, 148 in series with each other. The third current path 140 is connected to a point in the first current 138 path intermediate to the primary winding 145 and the first output 143. The switches 147, 148 preferably include MOSFETs. However, the switches 147, 148 may include different types of switching elements. The switches 147, 148 are arranged source-to-source or drain-to-drain to fully or partly negate the effect of the intrinsic body diodes of the switches 147, 148.

As will be explained in more detail below, the first power modifier 9' is configured to periodically close the switches 147, 148 and thus connect the first and second current paths 138, 139, thereby periodically interrupting the second cable current and reducing an average level thereof.

The gate terminals of the switches 147, 148 are each connected to an opto-isolator 149 which is connected, in turn, to control circuitry 150. First and second secondary windings 151, 152 of the transformer 146 are connected to the opto-isolator 149 and the control circuitry 150, respectively, to provide power thereto. The control circuitry 150 has an input 153 and an output 154. The input 153 is connected to a current sensor 250 configured to sense the current from one of the secondary windings 151, 152, in this case the first secondary winding 151. The output 154 is connected to the opto-isolator 149. In other examples, the control circuitry 150 may have different numbers of, and/or differently connected inputs and/or outputs.

Figure 14B:
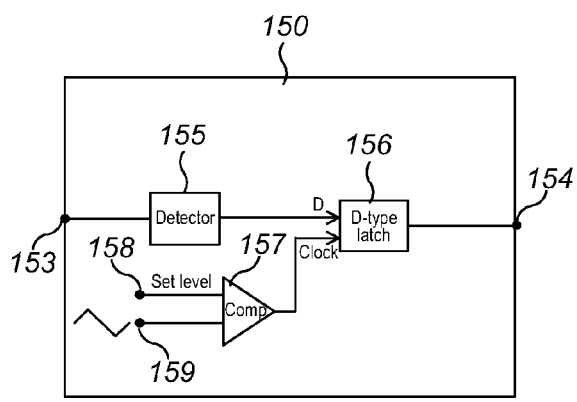
Figure 15:
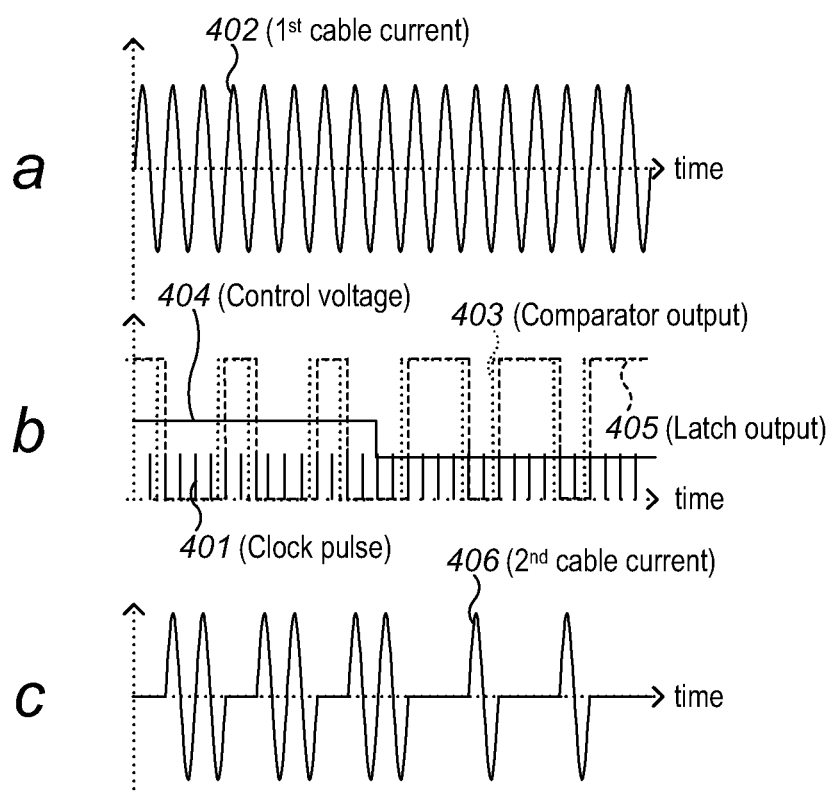
FIGS. 15a, 15b and 15c illustrate various current and voltage waveforms associated with the power modifier of FIGS. 14a and 14b.

Referring also to FIGS. 14b and 15, the control circuitry 150 and the associated voltages and currents will now be described in more detail. The control circuitry 150 includes a detector 155 having an input and an output, a D-type latch 156 having first and second inputs and an output, and a comparator 157 having first and second inputs and an output. The input to the detector 155 is connected to the input 153 to the control circuitry 150. The detector 155 is configured to provide at its output a voltage pulse 401 (hereinafter referred to as a "clock pulse") whenever the voltage 402 at the input 153 to the control circuitry 150 (i.e. the voltage 402 corresponding to the first cable current) crosses zero. The output of the detector 155 is connected to the first (clock) input to the D-type latch 156. The first and second inputs to the comparator 157 are connected to a control port 158 and to a voltage source 159, respectively. The comparator 121 is configured to provide at its output a voltage 403 which is high if the voltage 404 provided by the control port 158 (hereinafter referred to as the "control voltage") is higher than the voltage provided by the voltage source 159. The voltage source 159 is configured to provide a varying voltage (not shown in FIG. 15) which has, for example, a triangular waveform which varies between zero and a voltage corresponding to a maximum control voltage and which has a frequency of e.g. 200 Hz. Accordingly, the voltage 403 provided by the comparator 157 corresponds to a rectangular wave with a period of e.g. 200 hertz and a duty cycle corresponding to unity minus the ratio of the control voltage 404 to the maximum control voltage (e.g. a duty cycle of 33% when the control voltage 404 is 67% of the maximum control voltage). The control voltage 404 may be set in any suitable way, for example by way of a user interface or a communications interface configured to communicate with a remote device. In FIG. 15, the ratio of the frequency of the voltage provided by the voltage source 159 to the power frequency has been exaggerated by about a factor of about 100 in order to more clearly show certain features. The output of the comparator 157 is connected to the second (data) input to the D-type latch 156. The D-type latch 156 is configured to provide at its output a voltage 405 which broadly corresponds to the output voltage 403 of the comparator, i.e. to a rectangular wave. However, the transitions from high to low voltages, or low to high voltages, occur at the next point in time at which a clock pulse 401 is provided by the detector 155, i.e. at zero crossing points of the first cable current. The output of the D-type latch 156 is connected to the output 154 of the control circuitry 150, i.e. to the opto-isolator 149. The opto-isolator is configured to close the switches 147, 148 whenever the voltage 405 provided by the D-type latch 156 is high. When the switches 147, 148 are closed, the second cable current 406 is zero.

Accordingly, the second cable current 406 can be periodically interrupted with a frequency of e.g. 200 hertz and with a duty cycle which depends upon the control voltage. The ratio of the average level of second cable current 406 to that of the first cable current 402 corresponds to the duty cycle and hence the ratio of the control voltage 404 to its maximum. When the control voltage 404 equals its maximum or zero, the second cable current 406 corresponds to the first cable current 402 or zero, respectively.

Thus, the first power modifier 9' can provide a way of controlling the average power in the second part of the power cable 4 and hence the power received by the couplers 6 connected to the second part of the power cable 4 and provided to the loads 8 connected thereto.

Where the loads 8 include LEDs, the flicker due to e.g. the 200 hertz variation of power in the second part of the power cable 4 should be imperceptible.

Further Modifications of the First Type of Power Modifier 9'

It will be appreciated that many other modifications may be made to the first power modifier 2'.

For example, the structural and/or functional features of the control circuitry 150 may be different from those described above.

The switches 147, 148 need not be switched at zero crossing points of the first cable current 402. However, switching at zero crossing points is preferably because, for example, it reduces the total harmonic distortion associated with, for example, the second cable current 406.

Instead of the two switches 147, 148, the first power modifier 9' may include only one switch.

The first power modifier 9' need not include the opto-isolator 149 (and the second secondary winding 152). However, in this case, there would be no galvanic isolation between the power cable 4 and, for example, the control circuitry 150, which should not then be connected to a user interface.

Second Type of Power Modifier 9"

Figure 16A:
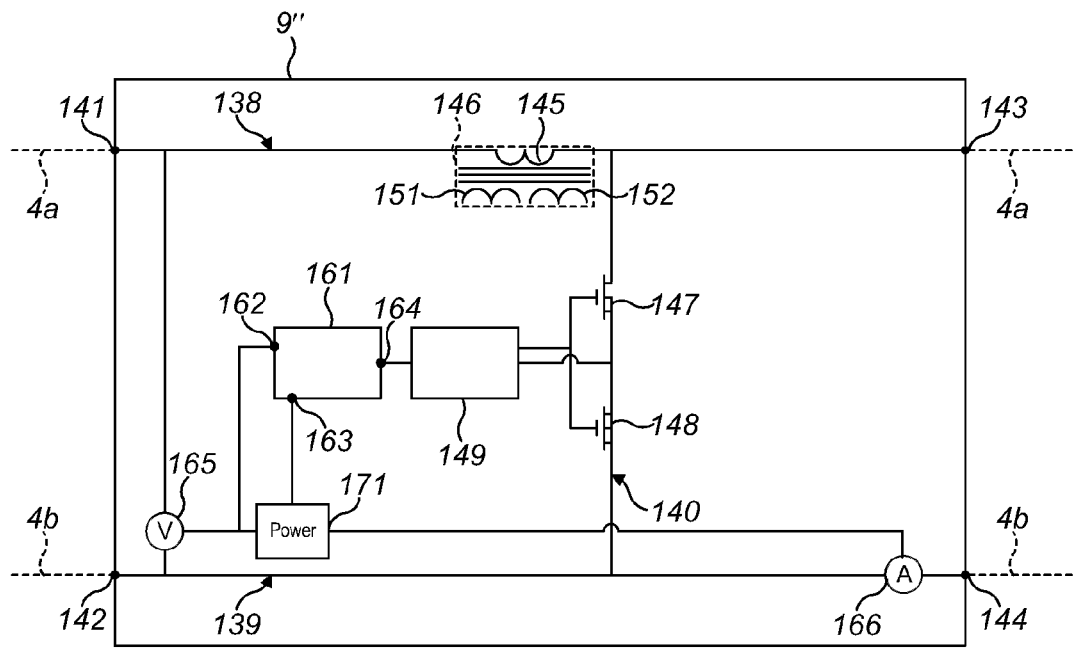
FIG. 16a illustrates another type of power modifier which may be included in the system of FIG. 1.

Referring to FIG. 16a, a second type of power modifier 9" (hereinafter referred to as a "second power modifier") will now be described. The second power modifier 9" includes the same features as the first power modifier 9', with the following exceptions.

As will be explained in more detail below, the second power modifier 9" is configured to connect the first and second current paths 138, 139 for a controllable fraction of each half cycle of the first cable voltage. This delays the second cable voltage relative to the second cable current and reduces the power factor associated with the power in the second part of the power cable 4. Accordingly, the second power modifier 9" can be compared to the fifth coupler 6*.

The control circuitry 161 in the second power modifier 9" is different from the control circuitry 150 of the first power modifier 9'. The control circuitry 161 has first and second inputs 162, 163, and an output 164. The first input 162 is connected to a voltage sensor 165 configured to sense the first/second cable voltage. The second input 163 is connected to a power determiner 171. The power determiner 171 is connected, in turn, to the voltage sensor 165 and to a current sensor 166 configured to sense the second cable current. The power determiner 171 is configured to provide to the second input 163 to the control circuitry 161 a signal indicative of (a filtered version of) the product of the second cable voltage and the second cable current, i.e. the power in the second part of the power cable 4. The output 164 of the control circuitry 161 is connected to the opto-isolator 149. In other examples, the control circuitry 161 may have different numbers of, and/or differently connected, inputs and/or outputs.

Figure 16B:
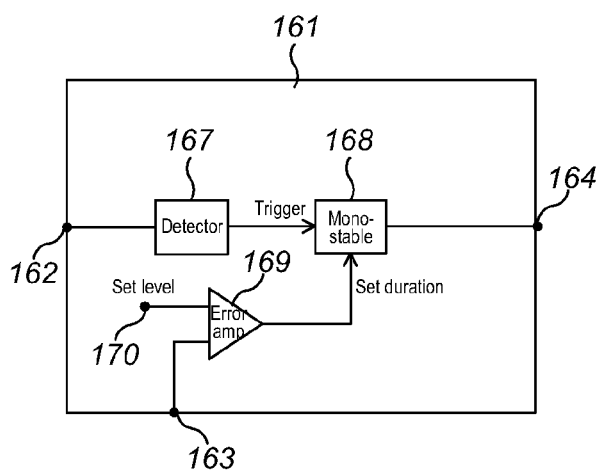
Figure 17:
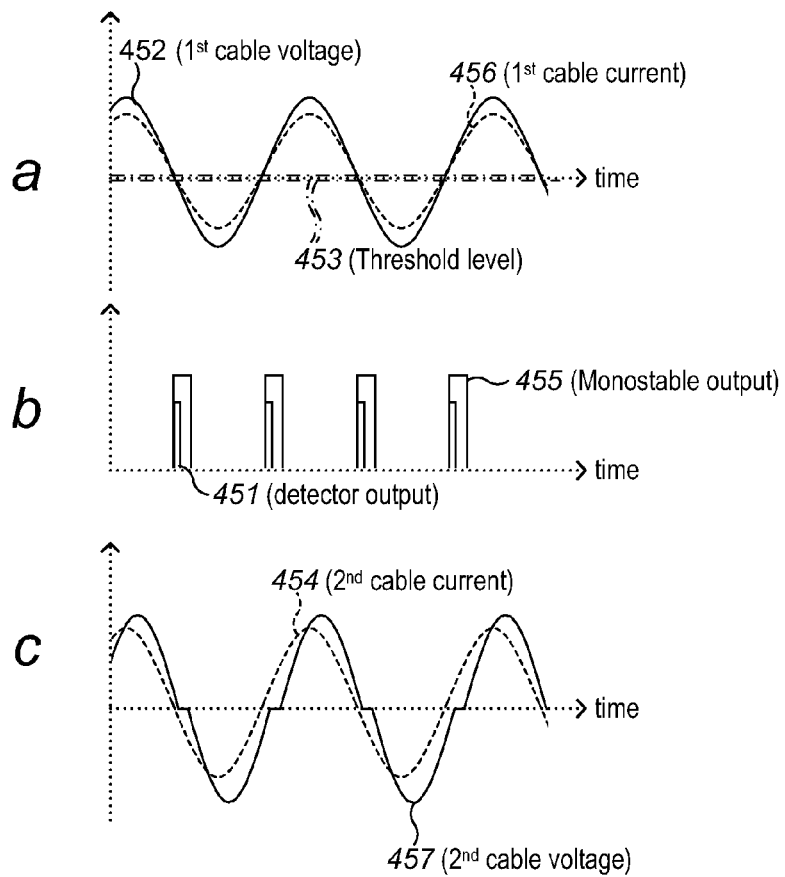
FIGS. 17a, 17b and 17c illustrate various current and voltage waveforms associated with the power modifier of FIGS. 16a and 16b.

Referring also to FIGS. 16b and 17 the control circuitry 161 and the associated voltages and currents will now be described in more detail. The control circuitry 161 includes a detector 167 having an input and an output, monostable circuitry 168 having first and second inputs and an output, an error amplifier 169 having first and second inputs and an output, and a control port 170. The input to the detector 167 is connected to the first input 162 to the control circuitry 161. The detector 167 is configured to provide at its output a voltage pulse 451 (hereinafter referred to as "trigger") whenever the magnitude of the voltage 452 at its input (i.e. the magnitude of the voltage 452 corresponding to the first cable voltage) decreases from above to below a small threshold level 453, i.e. decreases to close to zero. The output of the detector 167 is connected to the first input to the monostable circuitry 168. The first and second inputs to the error amplifier 169 are connected to the control port 170 and to the second control circuitry input 163, respectively. The error amplifier 169 is configured to provide at its output a voltage (not shown) indicative of the difference between the voltage (not shown) at the control port 170 (hereinafter referred to as the "control voltage") and the voltage (not shown) at the second input 163 to the control circuitry 161 (i.e. the voltage corresponding to the power in the second part of the cable 4). The control voltage may be set in any suitable way, for example by way of a user interface or a communications interface configured to communicate with a remote device. The output of the error amplifier 169 is connected to the second input to the monostable circuitry 168. The monostable circuitry 168 is configured to provide at its output a voltage pulse 455 in response to a trigger 451 from the detector 167, wherein the duration of the voltage pulse 455 is a fraction of the half-period of the first cable voltage 452 and is a suitable, e.g. linear, function of the voltage provided by the error amplifier 169. The output of the monostable circuitry 168 is connected to the output 164 of the control circuitry 161, i.e. to the opto-isolator 149.

Accordingly, the switches 147, 148 can be closed for a fraction of each half-cycle of the first cable voltage 452, at the beginning of each cycle of the first cable voltage 452. This causes the second cable voltage 457 to be zero for the fraction of the half-cycle. This delays the subsequent rise of the second cable voltage 457 and delays the second cable voltage 457 relative to the second cable current 454. Accordingly, the power in the second part of the power cable 4 is reduced relative to the power in the first part of the power cable 4, wherein the degree to which the power is reduced depends upon the control voltage (not shown).

Thus, the second power modifier 9" can provide another way of controlling the power in the second part of the power cable 4.

Further Variations of the Second Type of Power Modifier 9"

It will be appreciated that many other modifications may be made to the second power modifier 9".

For example, any of the abovedescribed modifications of the first power modifier 9' may also be made to the second power modifier 9".

Second Type of System 1"

Figure 18:
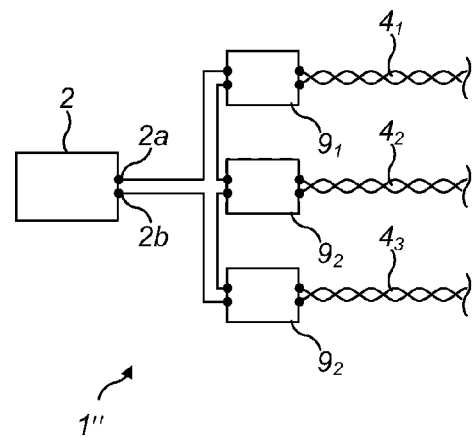
FIG. 18 illustrates another type of system for distributing power.

Referring to FIG. 18, a second type of system 1" (hereinafter referred to as a "second system") will now be described. The second system 1" includes a power supply 2 and several power modifiers 9. The power modifiers 9 may be of either the first or second type. In this example, there are three power modifiers 9, although there may be any number of two or more power modifiers 9.

Each power modifier 9 is connected, via its outputs, to a respective power cable 4 which forms a completed circuit for the current provided by the power modifier 9.

The power supply 2 and the inputs to the power modifiers 9 are connected to one another such that there is a completed circuit from the first power supply terminal 2a via the power modifiers 9 and the power cables 4 to the second power supply terminal 2b. In particular, the first power supply terminal 2a is connected to one of the inputs to a first one of the power modifiers 9, whose second input is connected to one of the inputs to a second one of the power modifiers 9, whose other input is connected to an input 143 of the third one of the power modifiers 9₂, whose other input is connected to the second power supply terminal 2b. The conductors used to form these connections are preferably short so as to minimise any voltage imbalances in the power cables 4, and to minimise the area between the conductors, thereby reducing radiation losses.

Thus, each power modifier 9 can semi-independently control the power in the power cable 4 to which it is connected.

Third Type of System 1'''

Figure 19:
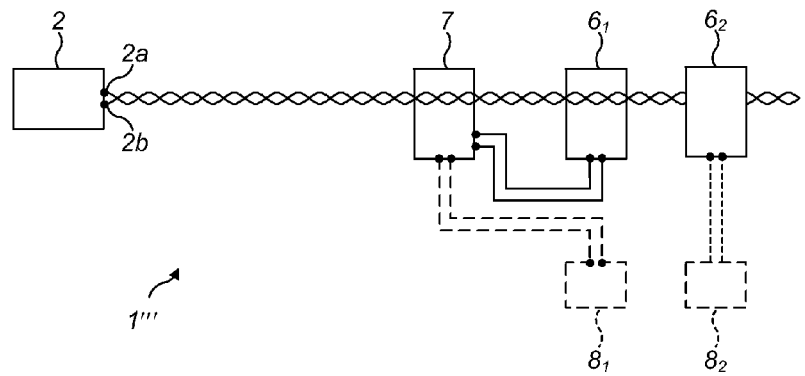
FIG. 19 illustrates another type of system for distributing power.

Referring to FIG. 19, a third type of system 1''' (hereinafter referred to as a "third system") will now be described. The third system 1''' includes a power supply 2, a power cable 4, a coupler 6₁, an emergency power device 7, and a further coupler 6₂. The power cable 4 is operatively connected to the power supply 2. The coupler 6₁ is operatively connected to the power cable 4 and to the emergency power device 7. The emergency power device 7 is also operatively connected to the power cable 4 and to a load 8₁. The further coupler $6_2$ is operatively connected to the power cable 4 and to a further load $8_2$. The loads $8_1$, $8_2$ preferably each include one or more LEDs. In other examples, there may be additional emergency power devices 7 and/or additional couplers 6 (which may or may not be operatively connected to an emergency power device 7).

As will be explained in more detail below, when power is being provided by the power supply 2 to the power cable 4, i.e. during normal operation, the emergency power device 7 charges a battery 203 (FIG. 20) and passes the output current provided by the coupler $6_1$ to the load $8_1$. When power is not being provided by the power supply 2 to the power cable 4, i.e. during emergency operation, the emergency power device 7 provides a current to the load $8_1$ from the battery 203.

Thus, the emergency power device 7 enables the third system 1''' to provide emergency power, e.g. for emergency lighting, in a simple and cost-effective way. For example, there is no need to provide another, separate power cable to the emergency power device 7.

Figure 20:
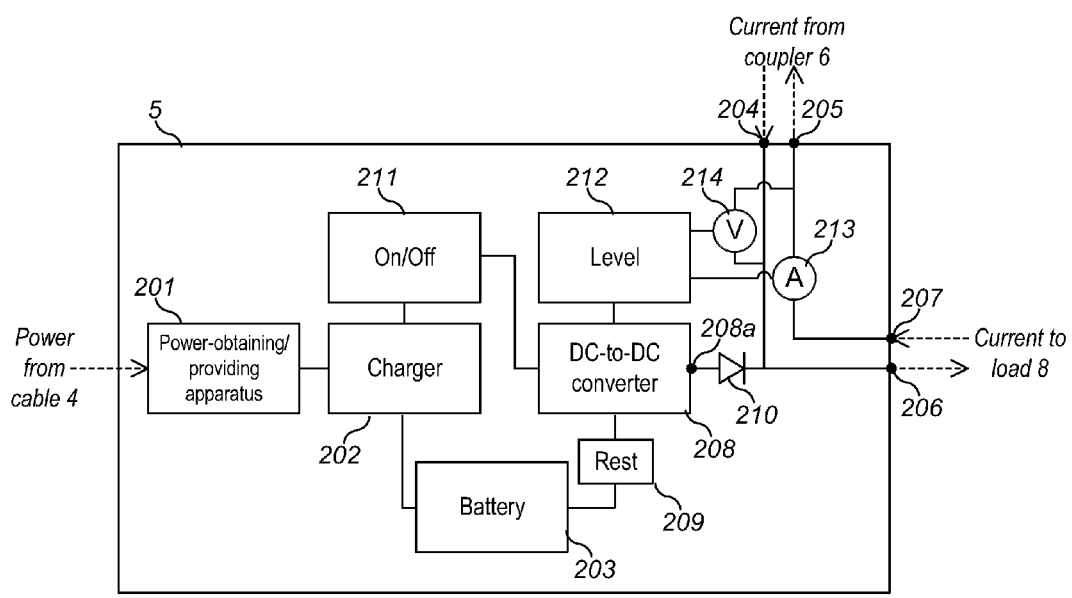
FIG. 20 illustrates an emergency power device included in the system of FIG. 19.

Referring also to FIG. 20, the emergency power device 7 will now be described in more detail. The emergency power device 7 includes, amongst other things, power-obtaining/providing apparatus 201, charging circuitry 202 operatively connected to the power-obtaining/providing apparatus 201, and a rechargeable battery 203 operatively connected to the charging circuitry 202. The power-obtaining/providing apparatus 201 is configured to obtain high-frequency AC power from the power cable 4 and to provide (DC) power to the charging circuitry 203. The power-obtaining/providing apparatus 201 may include the same features as any of the hereindescribed couplers 6. The charging circuitry 202 is configured to provide a suitable output for charging the battery 203. The charging circuitry 202 may be configured to vary the output in dependence upon the state of the battery 203, e.g. a terminal voltage of the battery 203. The charging circuitry 202 may be configured to charge the battery 203 more rapidly when the battery 203 is in a more discharged state. The battery 203 may be of any suitable type, e.g. a lithium-ion battery. In some examples, the battery 203 need not be included in the emergency power device 7 and the emergency power device 7 may include means for connecting to an external battery.

The emergency power device 7 further includes first and second inputs 204, 205, and first and second outputs 206, 207. The first and second main outputs 26, 27 of the coupler $6_1$ are connected to the first and second inputs 204, 205, respectively. The load $8_1$ is connected between the first and second outputs 206, 207. The first input 204 is connected to the first output 206, and the second input 205 is connected to the second output 207. Thus, any output current provided by the coupler $6_1$ is passed to the load $8_1$.

The battery 204 is operatively connected to a DC-to-DC converter 208 via a rest switch 209. The DC-to-DC converter 208 may comprise an inverter, a transformer, and a rectifier. The DC-to-DC converter 208 has an output 208a which is connected to the first output 206 of the emergency power device 7 via a diode 210. The diode 210 is orientated to allow current flow in a direction from the DC-to-DC converter 208 to the first output 206.

The DC-to-DC converter 208 is operatively connected to an on/off controller 211 and to a level controller 212.

The on/off controller 211 is configured to provide a control signal to the DC-to-DC converter 208 which indicates whether or not power is present in the power cable 4. The on/off controller 211 may determine whether or not power is present in the power cable 4 in any suitable way.

In this example, the on/off controller 211 is operatively connected to the charging circuitry 202 in order to make the determination. When the first control signal indicates that power is present in the power cable 4, the DC-to-DC converter 208 is configured not to provide any power via its output 208a. When the first control signal indicates that power is not present in the power cable 4, the DC-to-DC converter 208 is configured to provide power via its output 208a.

The level controller 212 is configured to provide a control signal to the DC-to-DC converter 208 which is used to determine the level of the power provided by the DC-to-DC converter 208 during emergency operation. The level controller 212 is configured to monitor the power provided by the coupler $6_1$ to the load $8_1$ during normal operation and to provide a control signal to the DC-to-DC converter 208 which indicates the maximum level of this power. The power provided by the DC-to-DC converter 208 during emergency operation is a predetermined percentage, e.g. 10%, of this maximum level. Thus, the emergency lighting module 5 can be used with various different couplers 6 and/or loads 8 and can automatically configure itself to provide a suitable level of power in each case. This applies even if the couplers 6 are dimmed for part of the time during normal operation.

In this example, the level controller 212 is operatively connected to a current sensor 213 which is connected between the second input 205 and the second output 207, and a voltage sensor 214 which is connected between the first and second outputs 206, 207. In other examples, the power may be sensed in different ways.

The emergency power device 7 may include means (not shown) to allow user control of the power provided by the DC-to-DC converter 208 to the load $8_1$ during emergency operation. This could be by way of a user-operable switch.

The rest switch 209 is configured to sense the output voltage of the battery 203 and to isolate the battery from the DC-to-DC converter 208 if the output voltage of the battery 203 falls below a predetermined voltage, e.g. 1 volt per cell. Thus, damage to the battery 203, for example due to voltage reversal, can be avoided during extended periods of emergency operation.

Aspects of the charging circuitry 202, on/off controller 211, level controller 212 and/or rest switch 209 may be implemented using one or more microcontrollers.

The emergency power device 7 is dependent upon power being always present in the power cable 4 during normal operation. To enable loads $8_1$, $8_2$ to be globally switched off without initiating emergency operation, a signal (hereinafter referred to as a "soft-off signal") can be provided via the power cable 4 to the couplers $6_1$, $6_2$.

In this example, the soft-off signal is provided by the power supply 2, although this need not be the case. The power supply 2 can be caused to provide the soft-off signal in any suitable way. For example, the power supply 2 may include a user-operable switch or an interface for communicating with a control system which controls provision of the soft-off signal.

The soft-off signal is preferably provided by modulating the frequency of the high-frequency AC power, e.g. by changing the frequency from 50 to 55 kilohertz with a 1% duty cycle. The soft-off signal is preferably provided continuously throughout a period of time in which the couplers $6_1$, $6_2$ are to remain off. This provides a robust way of communicating with the couplers $6_1$, $6_2$. However, other types of signals and communications protocols may also be used.

The couplers $6_1$, $6_2$ are each configured to receive the soft-off signal from the power cable 4 and, in response thereto, to switch off their output current. The couplers $6_1$, $6_2$ preferably each include a frequency modulation detector as well as control circuitry to enable them to do this. For example, the couplers $6_1$, $6_2$ may each correspond to the third coupler 6''' and may be configured to set the voltage at the control port 67 to a high level in response to receiving the soft-off signal.

Other Modifications

It will be appreciated that many other modifications may be made to the abovedescribed embodiments.

For example, instead of LEDs, the loads 8 may include different electrical devices.

One or more parts of the system 1 may be as described in WO 2010/106375 A2.

The invention claimed is:

1. Apparatus for providing a direct current to a load comprising one or more light emitting diodes, the apparatus comprising: a rectifier operatively connectable to a secondary winding of a transformer whose primary winding is for carrying a high-frequency alternating current; and a switch configured to periodically interrupt a current originating from the rectifier, thereby reducing an average level of the direct current provided to the load, wherein:

the apparatus comprises a first inductor configured to smooth the current originating from the rectifier, thereby providing a first current;

the switch is configured to periodically interrupt the first current, thereby providing a second current; and the apparatus further comprises a second inductor configured to smooth the second current.

2. Apparatus according to claim 1, wherein the alternating current has a frequency of at least 10 kilohertz.

3. Apparatus according to claim 1, wherein the switch is not comprised in the rectifier and wherein the switch is configured to periodically interrupt the current originating from the rectifier by completing a path therefor between first and second outputs of the rectifier.

4. Apparatus according to claim 1, wherein the switch is configured to interrupt the current originating from the rectifier with a frequency which is equal to a frequency of the current originating from the rectifier, a multiple thereof of the said frequency or a factor thereof of the said frequency.

5. Apparatus according to claim 1, wherein the switch is configured to interrupt the current originating from the rectifier for a pre-set and/or controllable fraction of the time.

6. Apparatus according to claim 1, comprising: a first capacitor operatively connectable to the secondary winding; and a second capacitor operatively connectable, at least partly via the synchronous rectifier, to the secondary winding, wherein the first and second capacitors together provide a reactance referred to the primary winding which substantially compensates for the reactance of the primary winding.

* * * * *